(12) United States Patent
Khadhraoui et al.

(10) Patent No.: US 11,914,089 B2
(45) Date of Patent: Feb. 27, 2024

(54) METHOD AND DEVICE FOR DETERMINING SONIC SLOWNESS

(71) Applicant: Schlumberger Technology Corporation, Sugar Land, TX (US)

(72) Inventors: Bassem Khadhraoui, Marseilles (FR); Lu Duc Duong Lam, Montpellier (FR); Ridvan Akkurt, Denver, CO (US); Hiroaki Yamamoto, Sugar Land, TX (US); Erik Wielemaker, The Hague (NL); Saad Kisra, Calgary (CA)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 302 days.

(21) Appl. No.: 17/250,941

(22) PCT Filed: Oct. 1, 2019

(86) PCT No.: PCT/US2019/053937
§ 371 (c)(1),
(2) Date: Mar. 31, 2021

(87) PCT Pub. No.: WO2020/072404
PCT Pub. Date: Apr. 9, 2020

(65) Prior Publication Data
US 2022/0018983 A1    Jan. 20, 2022

Related U.S. Application Data

(60) Provisional application No. 62/739,580, filed on Oct. 1, 2018.

(51) Int. Cl.
*G01V 1/30* (2006.01)
*G01V 1/34* (2006.01)
*G06N 3/04* (2023.01)

(52) U.S. Cl.
CPC .............. *G01V 1/303* (2013.01); *G01V 1/345* (2013.01); *G06N 3/04* (2013.01); *G01V 2210/6222* (2013.01)

(58) Field of Classification Search
CPC ................... G01V 1/303; G01V 1/345; G01V 2210/6222; G06N 3/04
See application file for complete search history.

(56) References Cited

U.S. PATENT DOCUMENTS 4,594,691 A * 6/1986 Kimball ................... G01V 1/48
    702/6
5,278,805 A * 1/1994 Kimball ................. G01V 1/362
    367/32
(Continued)

FOREIGN PATENT DOCUMENTS

WO    2017/165341 A2    9/2017

OTHER PUBLICATIONS

Valero, H.-P. et al., High resolution compressional slowness log estimation using first motion detection, SEG/Houston 2005 Annual Meeting, pp. 356-360.
(Continued)

*Primary Examiner* — Elias Desta
(74) *Attorney, Agent, or Firm* — Jeffrey D. Frantz

(57) ABSTRACT

Sonic logging data including a sonic waveform associated with a plurality of shot gathers is accessed. A transformation operator is applied to the sonic logging data to provide a transformed sonic image, the transformation operator including at least one of a short time average long time average (STA/LTA) operator, a phase shift operator, and a deconvolution operator. A machine learning process is performed using the transformed sonic image to determine a sonic slowness associated with the sonic logging data. The sonic slowness is provided as an output.

18 Claims, 21 Drawing Sheets

(56) References Cited

U.S. PATENT DOCUMENTS

| | | | | |
|---|---|---|---|---|
| 6,845,325 | B2* | 1/2005 | Valero | G01V 1/48 |
| | | | | 702/14 |
| 7,764,572 | B2 | 7/2010 | Wu et al. | |
| 9,563,354 | B2* | 2/2017 | Bellamy | G06F 3/017 |
| 10,072,919 | B1 | 9/2018 | Srinivasan et al. | |
| 2015/0356403 | A1 | 12/2015 | Storm, Jr. | |
| 2016/0216389 | A1 | 7/2016 | Hu | |
| 2018/0003840 | A1 | 1/2018 | Blanchard et al. | |
| 2018/0149019 | A1 | 5/2018 | Bose et al. | |
| 2018/0196156 | A1 | 7/2018 | Assous et al. | |

OTHER PUBLICATIONS

Khadhraoui B., Kisra S. and Nguyen H.M.T., A New Algorithm for High Depth Resolution Slowness Estimate on Sonic-Array Waveforms, SPWLA 59th Annual Logging Symposium, Jun. 2-6, 2018, London, UK, 10 pages.

Kimball, C., V. and Marzetta, T., Semblance processing of borehole acoustic array data, Geophysics,49(3), Mar. 1984, 274-281. https://doi.org/10.1190/1.441659.

Kimball, C. V., Shear slowness measurement by dispersive processing of the borehole flexural mode, Geophysics vol. 63, Issue 2, Mar.-Apr. 1998, pp. 337-344.

Torii T. et al., Shear slowness evaluation by parametric inversion of dipole waveforms, 2016 SEG International Exposition and 86th Annual Meeting, pp. 637-641.

Scheibner D. et al., 2010, Slow formation shear from an LWD tool: quadrupole inversion with a gulf of mexico example, SPWLA 51st Annual Logging Symposium, Jun. 2010, 14 pages.

Hsu K. and Chang S.K., 1985, Multiple shot processing of array sonic waveforms for high resolution sonic logs, SEG Conference, Borehole Geophysics II, BHG 2.4, pp. 42-44.

Yu G. and Mallat S., 2008, Audio denoising by time-frequency block thresholding, IEEE Transactions on Signal processing, vol. 56, No. 5, May 2008, pp. 1830-1839.

International Search Report and Written Opinion for the equivalent PCT Application PCT/US2019/053937 dated Jan. 17, 2020, 10 pages.

International Preliminary Report on Patentability of International Patent Application No. PCT/US2019/053937 dated Apr. 15, 2021, 7 pages.

Extended Search Report issued in European Patent Application No. 19869093.5 dated May 17, 2022, 6 pages.

Exam Report issued in European Patent Application No. 19869093.5 dated Aug. 18, 2023, 5 pages.

* cited by examiner

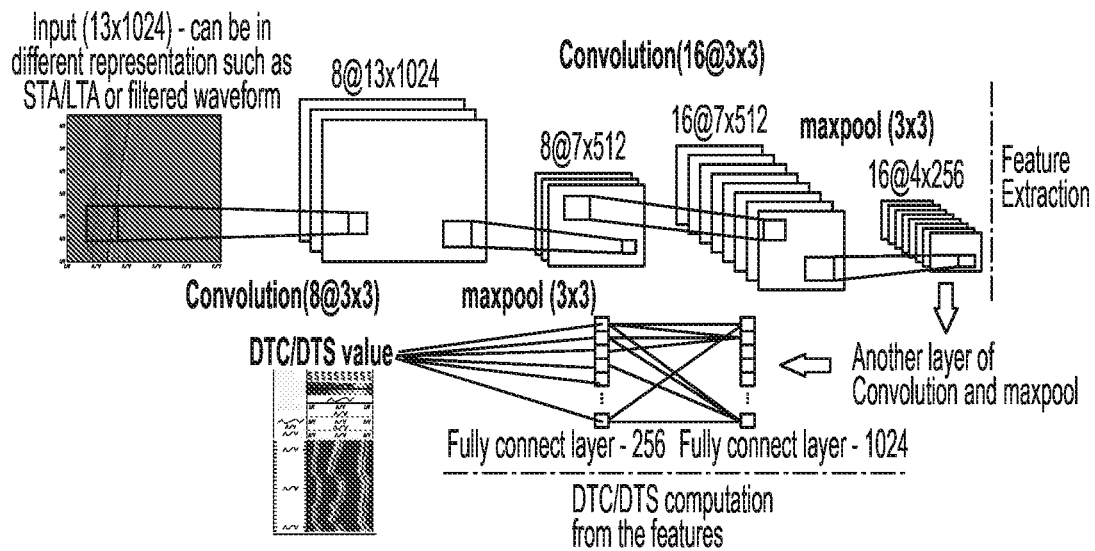

FIG. 12

| | |
|---|---|
| Convolutional Layer | Filter size = 3x3 |
| | Number of filter = 8 |
| | Activation = Relu |
| Convolutional Layer | Filter size = 3x3 |
| | Number of filter = 8 |
| | Activation = Relu |
| Max Pooling | Filter size = 3x3 |
| | Stride = 2x2 |
| Convolutional Layer | Filter size = 3x3 |
| | Number of filter = 16 |
| | Activation = Relu |
| Convolutional Layer | Filter size = 3x3 |
| | Number of filter = 16 |
| | Activation = Relu |
| Max Pooling | Filter size = 3x3 |
| | Stride = 2x2 |
| Convolutional Layer | Filter size = 3x3 |
| | Number of filter = 32 |
| | Activation = Relu |
| Convolutional Layer | Filter size = 3x3 |
| | Number of filter = 32 |
| | Activation = Relu |
| Max Pooling | Filter size = 3x3 |
| | Stride = 2x2 |
| Fully Connected Layer | Size = 1024 |
| Fully Connected Layer | Size = 400 |

METHOD AND DEVICE FOR DETERMINING SONIC SLOWNESS

CROSS REFERENCE PARAGRAPH

This application claims the benefit of U.S. Provisional Application No. 62/739,580, entitled "METHOD AND DEVICE FOR DETERMINING SONIC SLOWNESS," filed Oct. 1, 2018, the disclosure of which is hereby incorporated herein by reference.

BACKGROUND

Sonic logging may be performed in a subterranean formation using a logging tool, for example a wireline tool and/or a while drilling logging tool. A logging tool is placed in the subterranean formation (for example a borehole) and includes at least one transmitter for transmitting a reference sonic wave. The logging tool may include multiple receivers receiving and registering arrival sonic waves after propagation of the source wave through the subterranean formation. Sonic logging provides sonic data that may be used to characterize physical properties of the subterranean formation, such as properties of the rocks inside the subterranean formation. The sonic data may be used to estimate the sonic slownesses (e.g., inverse of velocity) in different parts of the subterranean formation. The slowness may be defined as an amount of time for a wave to travel a certain distance and may be measured in microseconds per foot.

The processing of sonic logging data has been an expert driven process. The results of the sonic logging analysis may vary significantly on the approach and skill of the expert conducting the analysis. Additionally, the capacity and availability of experts to perform the analysis limit the amount of sonic logging data that can be processed and may also introduce significant delay between the time that the acoustic data is recorded and the time that results are available. Improved approaches to acoustic data analysis are needed to increase accuracy and availability of sonic logging data analysis. Improved approaches are also needed to enable practical real time sonic slowness estimation for while drilling operations.

BRIEF SUMMARY

Methods and systems for determining sonic slowness are described.

In an embodiment, a method for determining sonic slowness is provided. Sonic logging data including a sonic waveform associated with a plurality of shot gathers is accessed. A transformation operator is applied to the sonic logging data to provide a transformed sonic image, the transformation operator including at least one of a short time average long time average (STA/LTA) operator, a phase shift operator, and a deconvolution operator. A machine learning process is performed using the transformed sonic image to determine a sonic slowness associated with the sonic logging data. The sonic slowness is provided as an output.

The sonic logging data may include a shot gather of a monopole waveforms, and the transformation operator may include the STA/LTA operator.

The sonic logging data may include a shot gather of a dipole waveforms, and the transformation operator may include the phase shift operator.

The sonic logging data may include a two-dimensional image, and the transformation may include the deconvolution operator.

The sonic logging data may include a three-dimensional image, and the transformation may include the deconvolution operator.

The machine learning process may include a convolutional neural network.

The determined sonic slowness may include at least one of a slowness of a compressional wave, a slowness of a shear wave, a slowness of a Stoneley wave, a slowness of a leaky-P wave, a slowness of a Raleigh wave, and a slowness of a pseudo-Raleigh wave.

The providing may include displaying the sonic slowness.

The providing may include displaying the sonic slowness as a function of depth.

In an embodiment, an apparatus includes an interface, a memory and a processor. The interface is configured to obtain sonic logging data including a sonic waveform associated with a plurality of shot gathers. The memory is configured to store computer executable instructions. The processor is operatively coupled to the interface and the memory. The processor is configured to execute the instructions and cause the apparatus to: apply a transformation operator to the sonic logging data to provide a transformed sonic image, the transformation operator including at least one of a short time average long time average (STA/LTA) operator, a phase shift operator, and a deconvolution operator; perform a machine learning process using the transformed sonic image to determine a sonic slowness associated with the sonic logging data; and provide the sonic slowness as an output.

The sonic logging data may include a shot gather of monopole waveforms, and the transformation operator may include the STA/LTA operator.

The sonic logging data may include a shot gather of dipole waveforms, and the transformation operator may include the phase shift operator.

The sonic logging data may include a two-dimensional image, and the transformation may include a deconvolution operator.

The sonic logging data may include a three-dimensional image, and the transformation may include a deconvolution operator.

The machine learning process may include a convolutional neural network.

The determined sonic slowness may include at least one of a slowness of a compressional wave, a slowness of a shear wave, a slowness of a Stoneley wave, a slowness of a leaky-P wave, a slowness of a Raleigh wave, and a slowness of a pseudo-Raleigh wave.

The apparatus may include a display configured to display the sonic slowness.

The display may be configured to display the sonic slowness as a function of depth.

In an embodiment, a method for training a machine learning process is provided. A plurality of sonic logging data including sonic waveforms associated with a plurality of shot gathers and a sonic slowness is accessed. A database of the machine learning process is trained using the sonic logging data as a training input and the sonic slowness as a training output.

A transformation operator may be applied to the sonic logging data before the training step, the transformation operator including at least one of a short time average long time average (STA/LTA) operator, a phase shift operator, and a deconvolution operator.

Although certain embodiments are described herein as an apparatus, one of ordinary skill will recognize that such an apparatus may be defined in a single integrated device, or alternatively, defined in a distributed system having components is more than one physical component. Thus, embodiments described as an apparatus, may be equally recognizable and defined as a system.

BRIEF DESCRIPTION OF THE DRAWINGS

The following drawings form part of the present specification and are included to further demonstrate certain aspects of the present disclosure. The disclosure may be better understood by reference to one or more of these drawings in combination with the detailed description of specific embodiments presented herein.

FIG. 12 is a schematic diagram of an exemplary convolutional neural network.

FIG. 13 is a table of configuration parameters for an exemplary convolutional neural network.

DETAILED DESCRIPTION

Various features and advantageous details are explained more fully with reference to the nonlimiting embodiments that are illustrated in the accompanying drawings and detailed in the following description. It should be understood, however, that the detailed description and the specific examples are given by way of illustration only, and not by way of limitation. Various substitutions, modifications, additions, and/or rearrangements within the spirit and/or scope of the disclosure will become apparent to those skilled in the art.

One technical problem addressed by the present embodiments is related to limitations in sonic logging analysis as an expert driven process. The present embodiments may include machine learning systems, such as deep learning, to process sonic logging data, for example, to determine sonic slowness. Thus, in an example, the present disclosure and the accompanying claims provide a technical solution to the technical problem of determining sonic slowness of sonic logging data. In some embodiments, the present embodiments may provide accurate results in a sufficiently short time period to allow for real-time logging while drilling decisions and processes to occur.

A subterranean formation may be a natural formation or artificial formation. It will be appreciated that an underground geological region may be below land or ocean without loss of generality. The underground geological region may include a subsurface formation in which a borehole is drilled. In addition to an area in close proximity to the borehole, the underground geological region may also include any area that affects or may affect the borehole or where the borehole may be drilled.

An exemplary embodiment is directed to slowness estimation for the formation around a borehole. A slowness estimate may be used to identify natural gas entry points in the borehole. A slowness estimate may also be used to estimate the porosity of a rock or of another material forming the borehole, to characterize the induced or natural anisotropies or orientations of the rock, to characterize the geomechanical properties of the rock in order for example to define a weight of fluid to be used while drilling the borehole. A slowness estimate may also be used to establish a time/depth relationship for the borehole, thus enabling a conversion of seismic data acquired for the borehole into depth data and to generate a cartography of the borehole properties.

Figure 1:
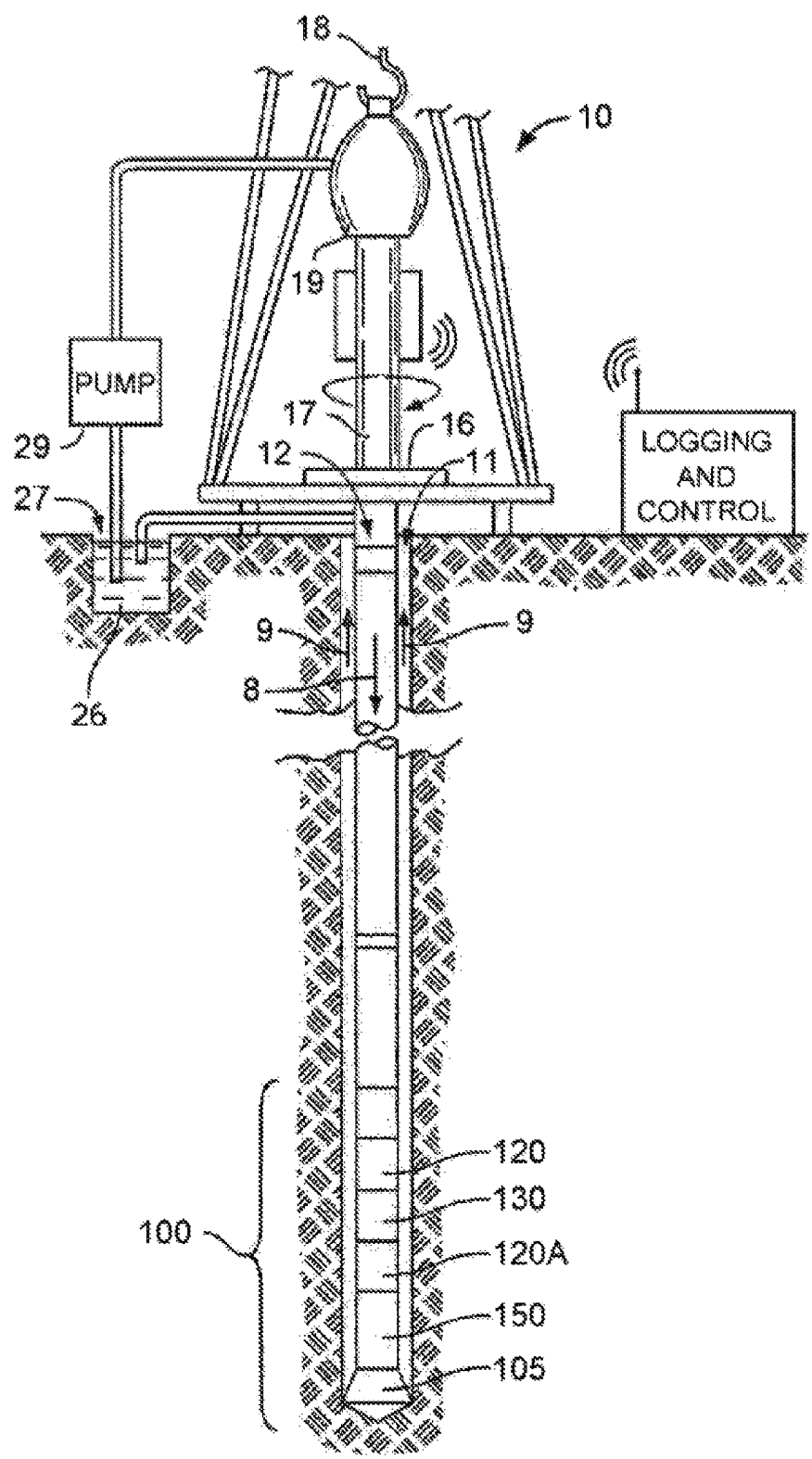
FIG. 1 is a schematic block diagram illustrating an embodiment of a wellsite system.

FIG. 1 illustrates a wellsite system in which the examples disclosed herein can be employed. The wellsite can be onshore or offshore. In this example system, a borehole 11 is formed in subsurface formations by rotary drilling. However, the examples described herein can also use directional drilling, as will be described hereinafter.

A drill string 12 may be suspended within the borehole 11 and has a bottom hole assembly 100 that includes a drill bit 105 at its lower end. The surface system may include a platform and derrick assembly 10 positioned over the borehole 11. The assembly 10 may include a rotary table 16, a kelly 17, a hook 18 and a rotary swivel 19. The drill string 12 may be rotated by the rotary table 16. The rotary table 16 may engage the kelly 17 at the upper end of the drill string 12. The drill string 12 may be suspended from the hook 18, which is attached to a traveling block. The drill string 12 may be positioned through the kelly 17 and the rotary swivel 19, which permits rotation of the drill string 12 relative to the hook 18. A top drive system may be used to impart rotation to the drill string 12. In this example, the surface system further includes drilling fluid or mud 26 stored in a pit 27 formed at the well site. A pump 29 delivers the drilling fluid 26 to the interior of the drill string 12 via a port in the swivel 19, causing the drilling fluid 26 to flow downwardly through the drill string 12 as indicated by the directional arrow 8. The drilling fluid 26 exits the drill string 12 via ports in the drill bit 105, and then circulates upwardly through the annulus region between the outside of the drill string 12 and the wall of the borehole 11, as indicated by the directional arrows 9.

In this manner, the drilling fluid 26 lubricates the drill bit 105 and carries formation cuttings up to the surface as it is returned to the pit 27 for recirculation.

The bottom hole assembly 100 of the example illustrated in FIG. 1 includes a logging-while-drilling (LWD) module 120, a measuring-while-drilling (MWD) module 130, a roto-steerable system and motor 150, and the drill bit 105.

The LWD module 120 may be housed in a special type of drill collar and may include one or more logging tools. In some examples, the bottom hole assembly 100 may include additional LWD and/or MWD modules. The LWD module 120 may include capabilities for measuring, processing, and storing information, as well as for communicating with the surface equipment. The LWD module 120 may include a sonic measuring device.

The MWD module 130 may also be housed in a drill collar and may include one or more devices for measuring characteristics of the drill string 12 and/or drill bit 105. The MWD module 130 may include an apparatus for generating electrical power for at least portions of the bottom hole assembly 100. The apparatus for generating electrical power may include a mud turbine generator powered by the flow of the drilling fluid. However, other power and/or battery systems may be employed. In this example, the MWD module 130 includes one or more of the following types of measuring devices: a weight-on-bit measuring device, a torque measuring device, a vibration measuring device, a shock measuring device, a stick slip measuring device, a direction measuring device and/or an inclination measuring device.

Although the components of FIG. 1 are shown and described as being implemented in a particular conveyance type, the examples disclosed herein are not limited to a particular conveyance type but, instead, may be implemented in connection with different conveyance types including, for example, coiled tubing, wireline wired drill pipe and/or any other conveyance types known in the industry.

Figure 2:
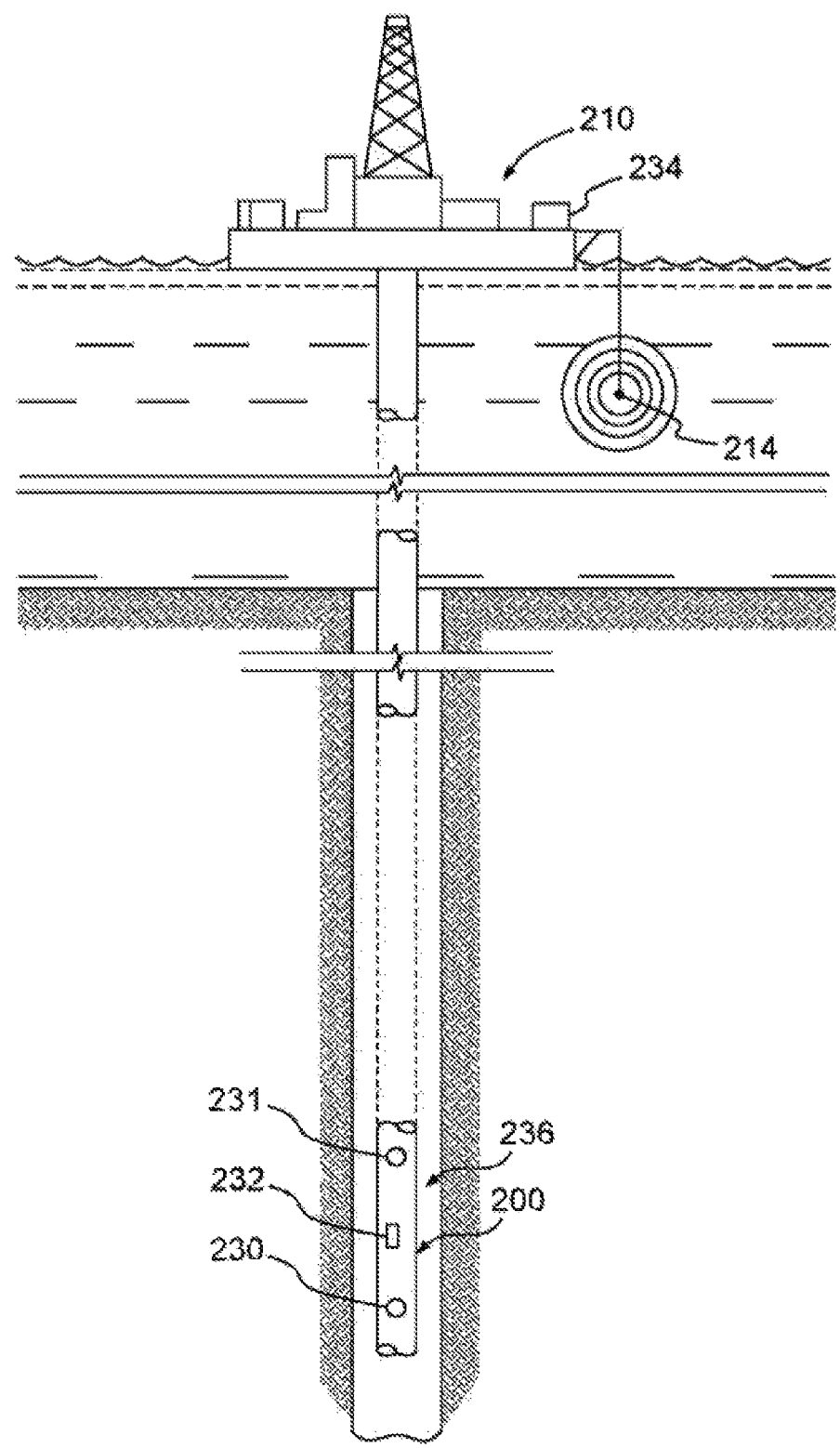
FIG. 2 is a schematic block diagram illustrating an embodiment of a wellsite system.

FIG. 2 illustrates a sonic logging-while-drilling tool that can be used to implement the LWD tool 120 or may be a part of an LWD tool suite 120A. An offshore rig 210 having a sonic transmitting source or array 214 may be deployed near the surface of the water. In at least some embodiments, any other type of uphole or downhole source or transmitter may be provided to transmit sonic signals. In some examples, an uphole processor controls the firing of the transmitter 214.

Uphole equipment may also include acoustic receivers and a recorder for capturing reference signals near the source of the signals (e.g., the transmitter 214). The uphole equipment may also include telemetry equipment for receiving MWD signals from the downhole equipment. The telemetry equipment and the recorder may be coupled to a processor so that recordings may be synchronized using uphole and downhole clocks. A downhole LWD module 200 includes one or more acoustic receivers (e.g., 230 and 231), which are coupled to a signal processor so that recordings may be made of signals detected by the receivers in synchronization with the firing of the signal source.

In operation, the transmitter 214 transmits signals and/or waves that are received by one or more of the receivers 230, 231. The received signals may be recorded and/or logged to generate associated waveform data. The waveform data may be processed by processors 232 and/or 234 to determine slowness values as disclosed herein.

Figure 3:
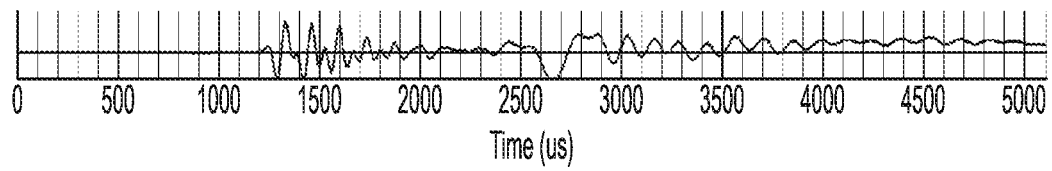
FIG. 3 is a plot of an exemplary sonic waveform.
Figure 4:
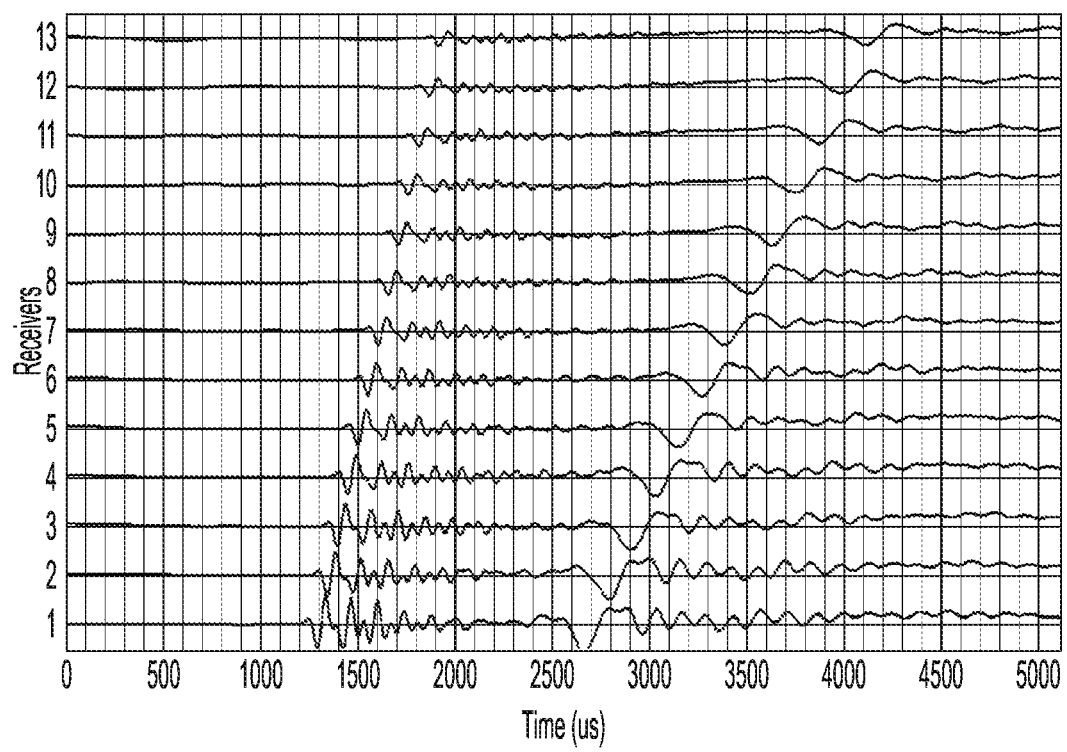
FIG. 4 is a plot of an exemplary shot gather.

One exemplary objective of sonic logging is to estimate the slowness of propagating acoustic waves in the borehole formation. A sonic tool may include one or several transmitters and one or several receivers. For a certain tool position in the wellbore, a transmitter is fired. The released energy travels through different mediums (e.g. borehole fluid, borehole formation rock . . . ). Part of this energy is captured by the receivers available in the sonic tool. When the transmitter is fired, the receivers start recording for a time duration. In this record, there may be ambient noise. Along the ambient noise, at a later time, the captured transmitter-released energy is recorded. This record may be referred to as a sonic waveform. An example of a sonic waveform is depicted in FIG. 3. For a given shot, several waveforms may be recorded associated with a plurality of receivers. An example of a shot gather associated with a sonic tool having thirteen receivers is depicted in FIG. 4. The set of waveforms recorded for a shot may be referred to as a shot gather. The analysis of these waveforms on a shot basis, helps identify the different onset arrivals (e.g. compressional waves, shear waves, Stoneley waves, leaky-P waves). The slowness of these waves can be determined for the rock available at the considered depth.

The analysis of the recorded waveforms may provide the travel times of the acquired energy modes (e.g. compressional waves, shear waves, Stoneley waves, leaky-P waves) along the associated slowness values. The sonic slowness can be determined from arrival time picking (such as by a first motion detection algorithm or a fast arrival time and slowness estimation) or directly by algorithms such as a slowness time coherence (STC) algorithm, a dispersive STC algorithm, dipole inversion, and quadrupole inversion.

The previously referred to algorithms may be applied to wireline and LWD data, particularly STC. Sonic waveforms have been acquired in thousands of wells and processed to generate compressional, shear and/or Stoneley slowness. The processing of such data has required the intervention of expert users.

A workflow, which may be implemented in real time, will now be discussed. In one example, the workflow determines the slowness from the recorded borehole sonic waveforms. In another example, the workflow determines travel-times from waveforms. The obtained travel-times can then be used to derive high-depth-resolution slowness logs. The workflow preferably includes machine learning techniques.

A collection of sonic waveforms and associated processing results are gathered and subdivided into shot gathers. The waveforms may undergo a preparation step such as noise reduction or information enhancement following which the content of interest becomes easier to process and/or to interpret. A convolutional neural network may be trained with both sonic waveforms and associated results (e.g. slowness). A relationship may be established between the input sonic waveforms and the sought result. Following this process, a trained neural network may be created. The neural network may directly derive a slowness result (or travel-times) from the input waveforms. The generated neural network can be used for prediction purposes. When a set of waveforms is input to the network, the associated result (e.g. slowness, travel-times) may be computed directly.

This trained model may be used with data acquired by both wireline and Logging While Drilling (LWD) sonic tools. The workflow can be used in real-time embedded and post-processing applications. The generated results of the workflow may provide slowness determinations. Additionally, the output may be used to validate the results of other processing techniques (e.g. Slowness Time Coherence).

In an example, the method includes a machine learning technique such as a convolutional neural network (CNN). A collection of input and output data may be used to train a CNN model.

The input data for model training may include one or more of recorded data, synthetic data or combinations thereof, for example as described below.

Recorded data: sonic waveforms acquired by sonic tools in a well or logging environment. The waveforms may be pre-processed (e.g. noise attenuation). Outliers may be removed prior to incorporation in the database or the outlier may be removed.

Synthetic data: synthetic sonic waveforms. Noise or transforms may be added to increase the quantity of data in the database.

Combination of the above: recorded waveforms in a shot gather with known slowness values can be time-shifted in order to obtain a new shot gather with a pre-defined synthetic slowness value. For a given recorded shot gather with known slowness value, a large collection of pseudo-synthetic shot gathers can be generated to provide a range of possible slowness values. The moveout/real slowness (e.g., 65 μs/ft) may be corrected by respectively time-shifting the waveforms of the shot gather to provide a new moveout associated with a synthetic slowness value (e.g., 80 μs/ft). This process may be repeated to cover a range of slowness values (e.g., from 40 μs/ft to 240 μs/ft for compressional slowness) and provide a large collection of pseudo-synthetic waveforms (e.g., recorded waveforms with associated synthetic slowness value).

Time shifting of waveforms may including padding the waveforms. Padding may include extrapolating, e.g., adding time samples to each waveform signal to provide a common start time and end time. The waveform padding may include applying a linear prediction filter, padding the waveforms with a constant value, and linear extrapolation to the mean value.

Figure 5:
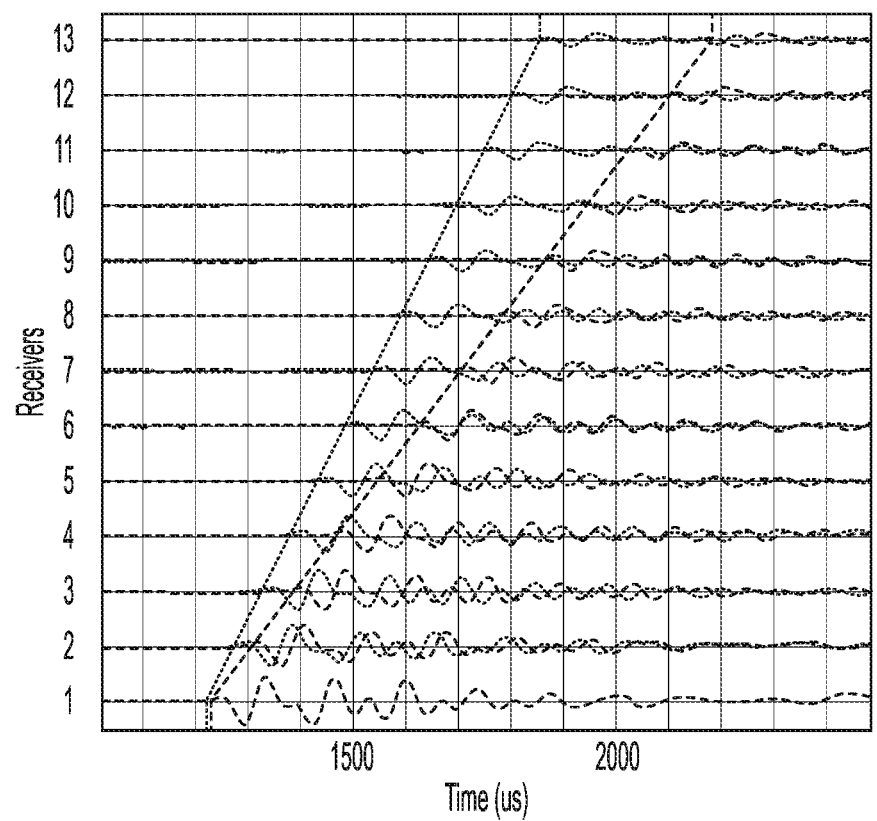
FIG. 5 is a plot of an exemplary shot gather and compressional slowness.

FIG. 5 shows an example of a recorded shot gather. The recorded shot gather is plotted in the dotted lines. In this example, the compressional slowness is 106 μs/ft. The compressional slowness is provided by the slope of the diagonal dotted line. A time shifted waveform is plotted in the dashed lines to provide a pseudo-synthetic shot gather. In the time shifted waveform, each receiver is time shifted except for the near receiver to create a waveform with a compressional slowness of 160 μs/ft. The compressional slowness is provided by the slope of the diagonal dashed line. This process may also be applied to generate gathers focused on P-waves, S-waves, and Stoneley waves.

Figure 6:
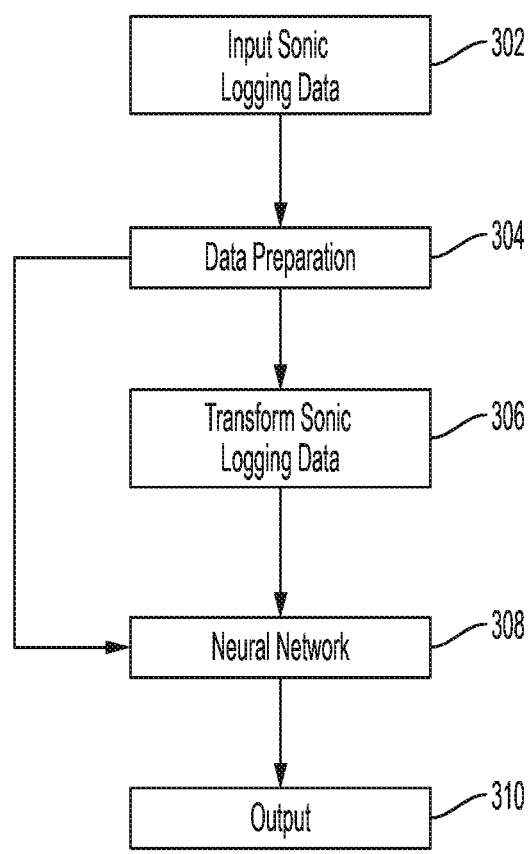
FIG. 6 is a flow chart of an exemplary process for determining sonic slowness.

Referring to FIG. 6, at step 302, data is input to the model. Preferably, the type of data input is the type of data that the database was trained on. Where the database was trained on a data set of a different type, a transform may be applied to the input data to transform it to the type of data for which the database was trained. For example, a trained full array monopole CNN model may be used to process the monopole waveform data acquired by a sonic tool made of an array of receivers in full array mode.

The input waveforms may be represented as a collection of shot gathers. A shot gather may include a set of waveforms recorded by a number of receivers. If the number of waveforms exceeds the number of receivers for which the database was trained, the number of receivers may be reduced, automatically or by the user, in the data preparation step.

The input data may be prepared in a data preparation step 304. The data preparation step 304 may include noise reduction through the application of filters such as a classic bandpass filter, a linear prediction filter, an adaptive filter, an adaptive block thresholding filter, median filter, or any other filter that may enhance the quality of the data of interest.

The data preparation step 304 may also include identifying and removing outliers in the input data.

With reference to FIG. 4, the waveforms recorded in a shot gather may be represented in a "wiggle" plot. The shot gather may also be represented as a greyscale image such as that shown in FIG. 7. The x-axis of the image corresponds to the acquisition time, and the y-axis corresponds to the receiver index. The darkness of a pixel corresponds to the waveform's amplitude at a time for a receiver. An exemplary objective of the sonic data processing is to estimate the slowness of a wave such as a compressional wave, a shear wave, or a Stoneley waves in a shot gather.

Figure 8:
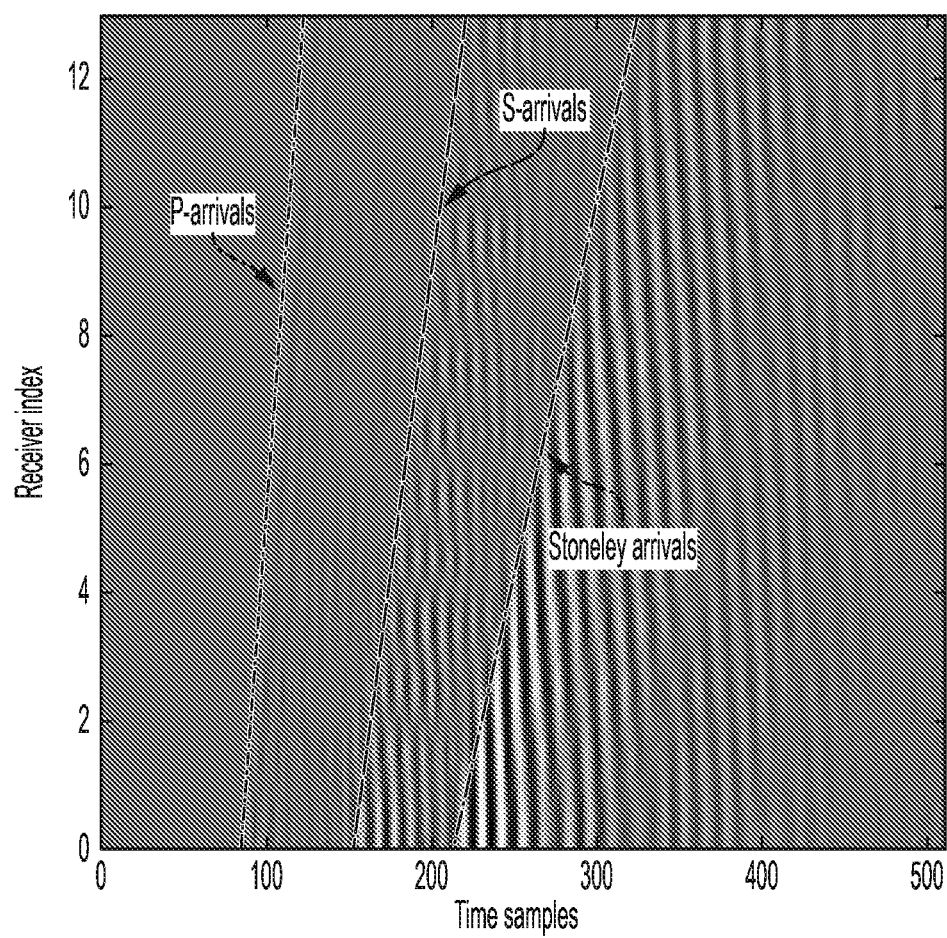
FIG. 8 is a plot of an exemplary shot gather and associated features.

The intercepted waves of interest may be headwaves. For a given tool position, the processing may consider set of receivers illuminating a piece of rock as having a constant slowness. The processing may look for coherent events in a shot gather under a linear moveout constraint. The processed receivers may represent a sub-array of the receivers available in the tool. When the sonic tool is not positioned at a boundary between geological layers, these headwaves may be observed as shown in FIG. 8. The compressional, shear or Stoneley arrivals can be represented by a linear moveout. A straight line may capture the arrivals of these waves. The slope of such a line is used to compute the slowness of the considered type of waves.

If the tool is positioned at a geological boundary, then preferably a line is determined for every geological layer illuminated by the receivers' aperture. For example, in the presence of two layers, a total of two lines are preferable to capture the arrivals of the waves of interest (e.g. P-waves). In one example, the number of receivers used in the processing may be reduced to reduce the likelihood that the tool is positioned at a geological boundary. With a smaller receiver aperture, the moveout of the waves of interest may appear linear.

Figure 7:
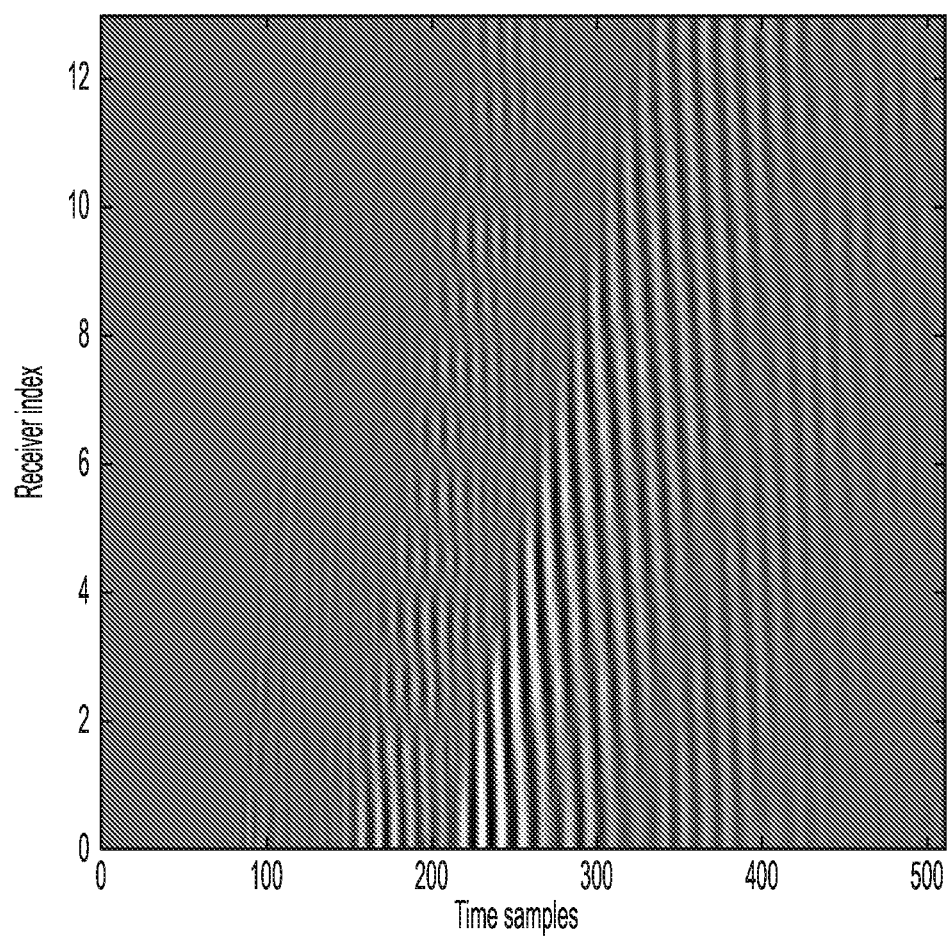
FIG. 7 is a plot of an exemplary shot gather.

The identification of the headwaves in such greyscale images (e.g., FIGS. 7 and 8 can be difficult and require significant input by expert operators, for example, to edit or relabel data to accurately determine slowness.

In one example, machine learning such as deep neural networks, are employed to improve the accuracy of the image recognition. In a particular example, a convolutional neural network (CNN) is used. The CNN is described by way of example and it will be appreciated that other techniques may also be used.

An objective of the CNN is to identify the lines that are capturing the arrivals of the waves of interest (e.g., P-waves). Referring back to FIG. 6, following the preparation of the data at step 304, the shot gather waveform may be provided to a deep neural network such as a CNN at step 308. The CNN may be trained with the input data discussed above that has known slowness or slowness determined by an expert for the purpose of training the CNN database.

In an example, a data transformation step 306 is performed after the data preparation step 304 prior to providing the data to the neural network at step 308. An example of the data transformation is to apply an operator to the waveforms to generate new signals. An example operator includes a deconvolution. Preferably, the newly generated signals provide content that is easier to process by the neural network.

Figure 9:
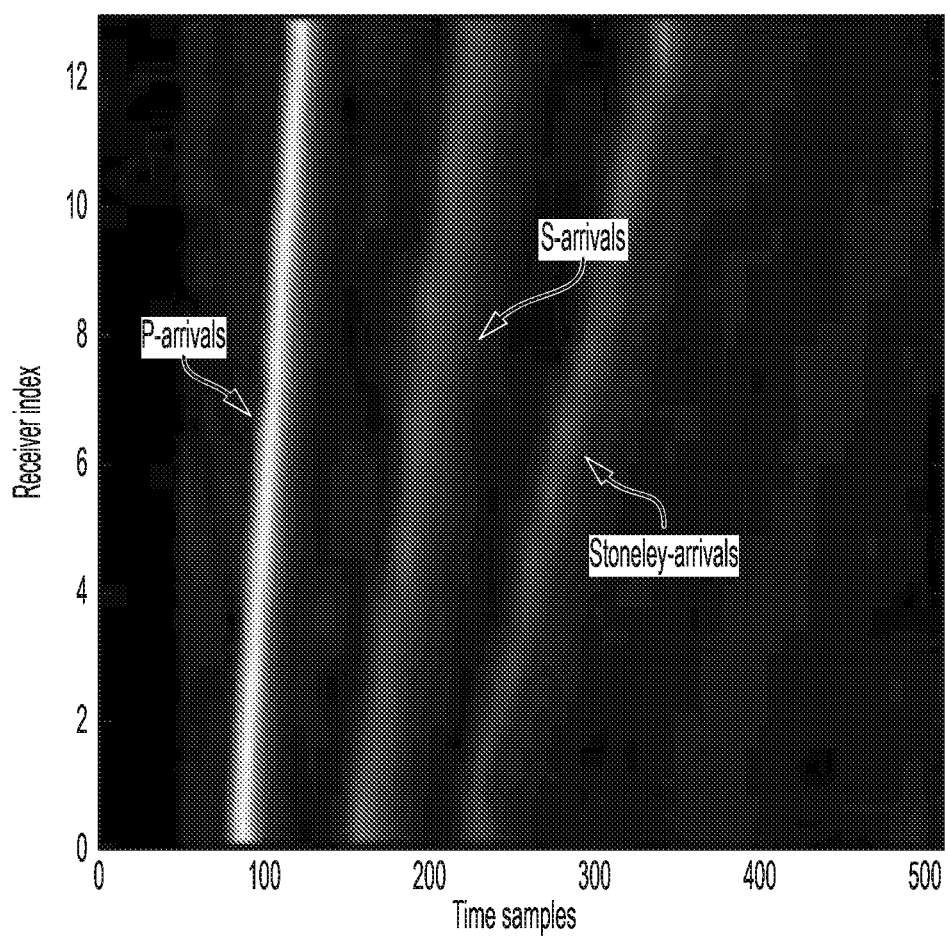
FIG. 9 is a plot of an exemplary transformed shot gather.

In one particular example, a Short Time Average/Long Time Average (STA/LTA) operator is applied to the input waveforms. The use of an STA/LTA image may improve the network processing reliability by reducing the uncertainty associated with moveout identification when dealing with images of sonic waveforms. FIG. 9 is an example of applying the STA/LTA approach to generate a CNN input image from a shot gather of monopole waveforms. An exemplary equation for the STA/LTA operator is:

$$STALTA_g(t) = \frac{lw}{sw} \cdot \frac{\int_t^{t+sw} g(u) \cdot du}{\varepsilon^2 + \int_{t-lw}^{t} g(u) \cdot du}$$

where g represents the Hilbert envelope of the considered waveform, 0<sw≤lw, and ε is a small constant number. The transformed data may then be provided to the neural network at step 308.

Figure 10:
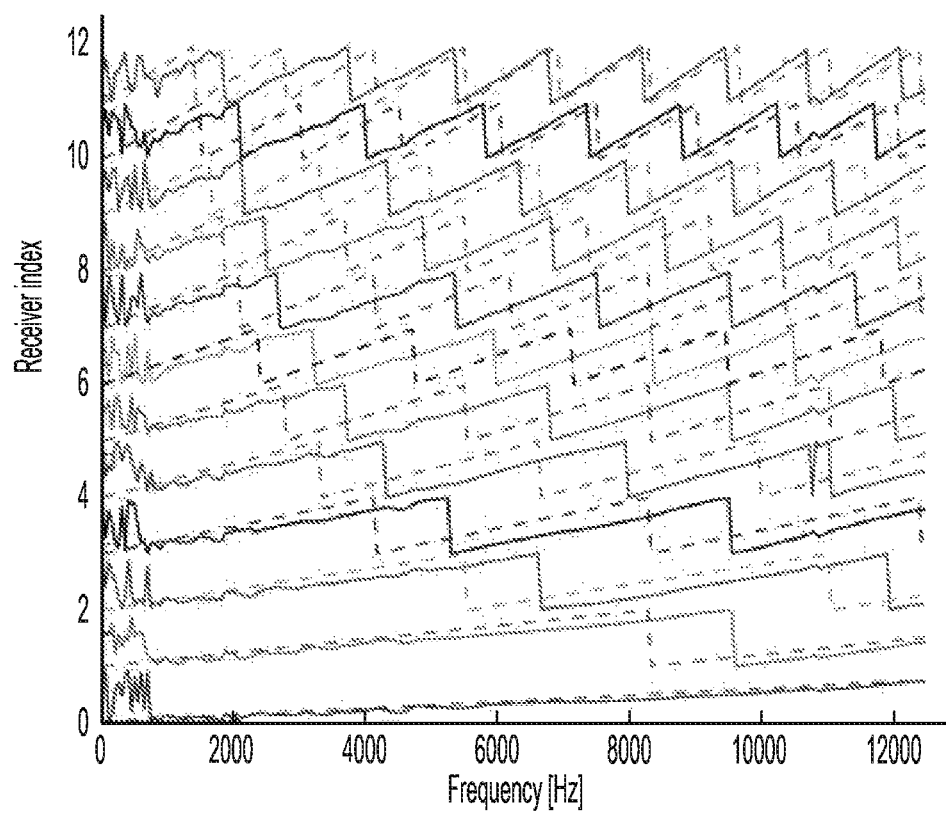
FIG. 10 is a plot of an exemplary transformed shot gather.
Figure 11:
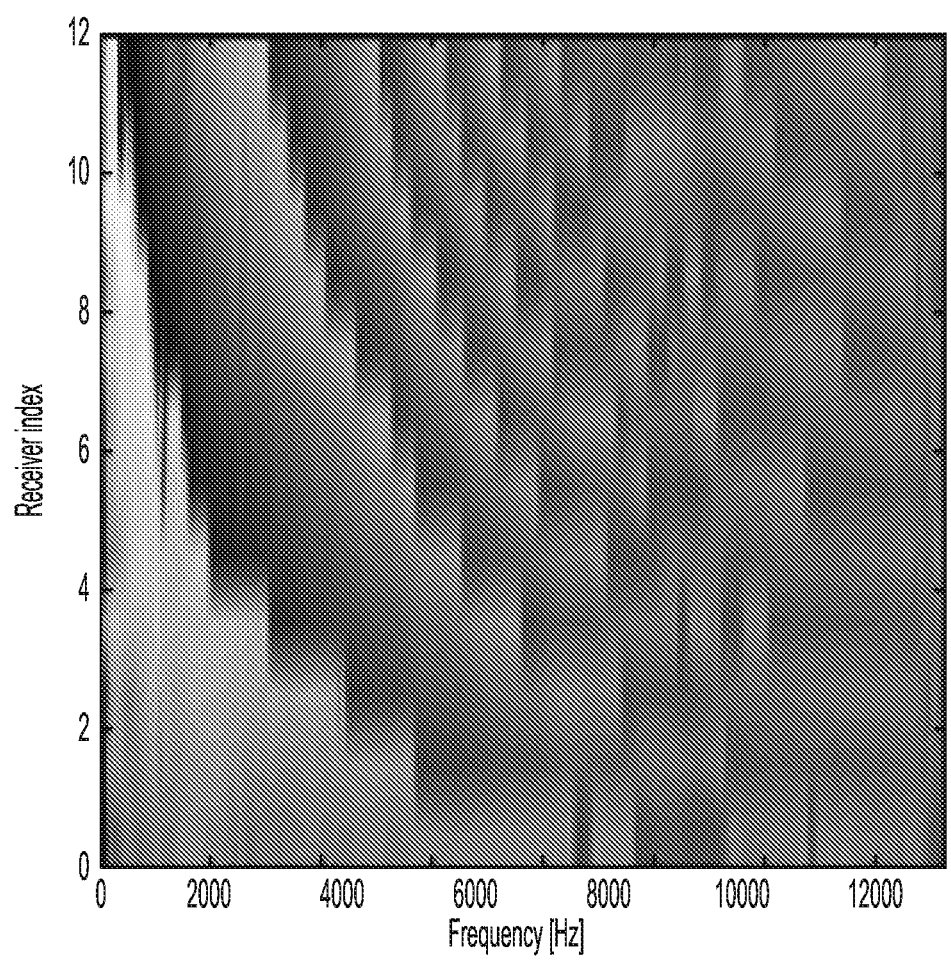
FIG. 11 is a plot of an exemplary transformed shot gather shown in greyscale.

For waveforms with stronger dispersive content such as the dipole waveforms, the transform may include a phase shift in the frequency domain for pairs of waveforms. In a shot gather, the phase shift may be computed between a receiver's waveform and a near receiver's one. FIG. 10 shows an exemplary result of a determination of the phase shift for dipole waveforms recorded by a wireline sonic tool with thirteen inline receivers. In this case, twelve curves were generated in the frequency domain. In FIG. 10, the phase-shift curves have not been unwrapped though it will be appreciated that the curves may also be unwrapped. The transformed curves may also be displayed as a greyscale image such as that shown in FIG. 11. The process then proceeds to the neural network at step 308.

Referring to the neural network processing step 308, in an example, a CNN network is used to process the (transformed) shot waveform input data to output slowness or travel-time data. FIG. 12 illustrates an exemplary schematic diagram for a CNN and FIG. 13 illustrates exemplary configuration parameters for the CNN of FIG. 12. It will be appreciated that other types of neural networks or architectures may also be used. It will also be appreciated that the neural network processing step 308 may operate with raw data that has not been transformed such as in the data transformation step 306.

As discussed above, a set of waveforms and associated slowness is used to train the multi-layer CNN, for example such as that of FIG. 12.

In an example with input data with monopole waveforms and associated compressional slowness logs, the input waveforms may be processed for noise reduction. Then, the STA/LTA operator may be applied to the input data.

Figure 14:
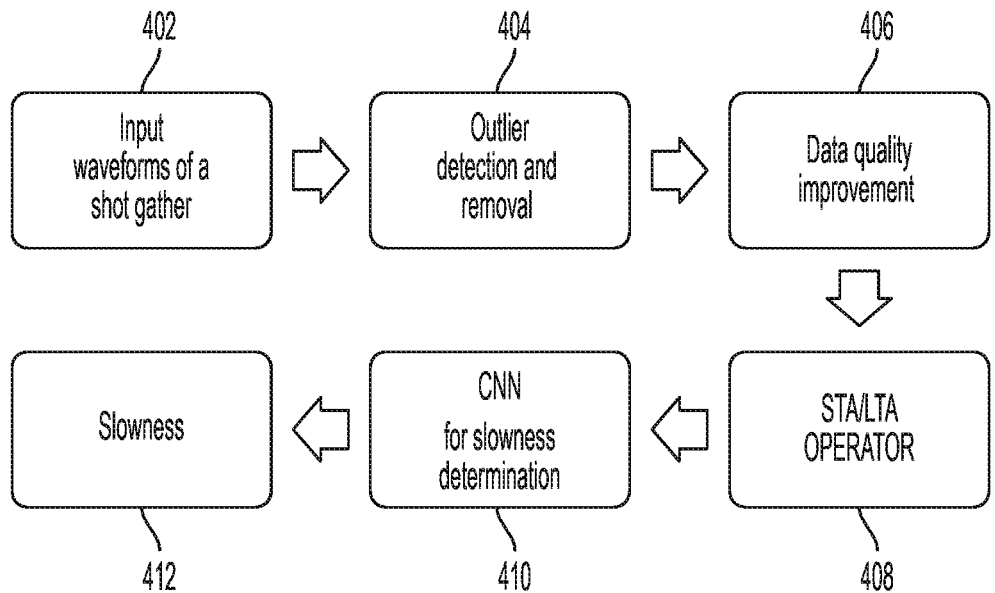
FIG. 14 is a flow chart of an exemplary determination of slowness for monopole waveforms.

With reference to FIG. 14, waveforms of a shot gather with monopole waveforms are input at step 402. In some embodiments, outliers are detected and removed from the input data at step 404. In some embodiments, data quality improvement (e.g., noise removal) is performed at step 406. In some embodiments, the data is transformed such as by an STA/LTA operator at step 408. At step 410, the CNN is applied to the (transformed) input data for slowness determination. At step 412, the determined slowness is output.

Figure 15:
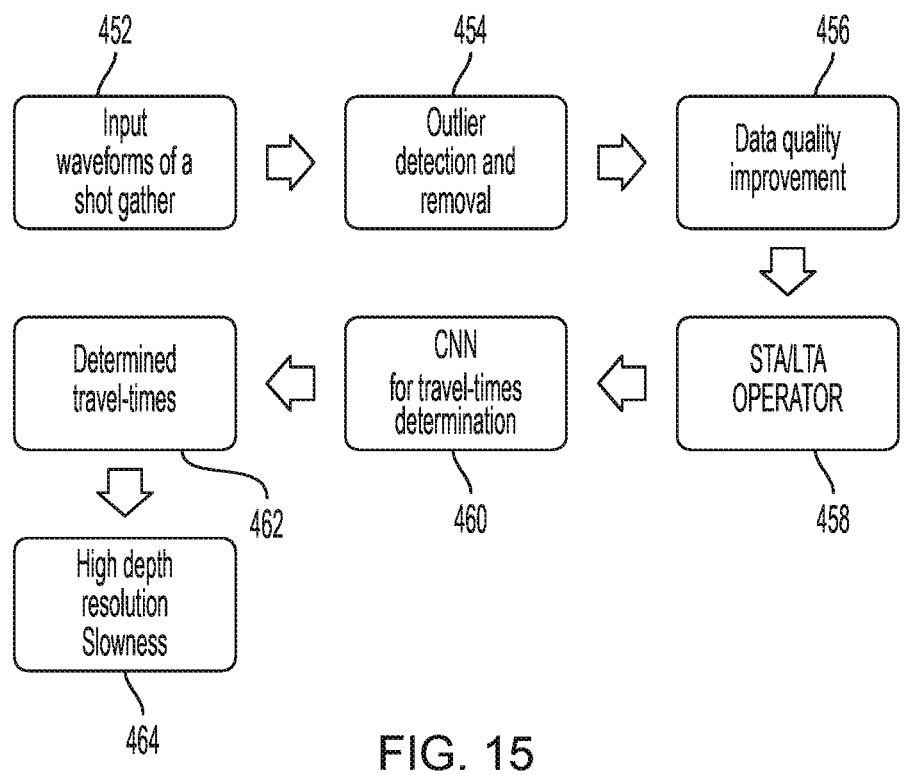
FIG. 15 is a flow chart of an exemplary determination of slowness for monopole waveforms.

With reference to FIG. 15, waveforms of a shot gather with monopole waveforms are input at step 452. In some embodiments, outliers are detected and removed from the input data at step 454. In some embodiments, data quality improvement (e.g., noise removal) is performed at step 456. In some embodiments, the data is transformed such as by an STA/LTA operator at step 458. At step 460, the CNN is applied to the (transformed) input data for travel time determination. At step 462, the determined travel times are output. At step 464, the determined travel times are converted to high depth resolution slowness and output.

In an example with input data with dipole waveforms and associated shear slowness logs, the input dipole waveforms may be used to compute a phase shift between the respective receiver's waveform and the near offset receiver's waveform in the shot gather.

Figure 16:
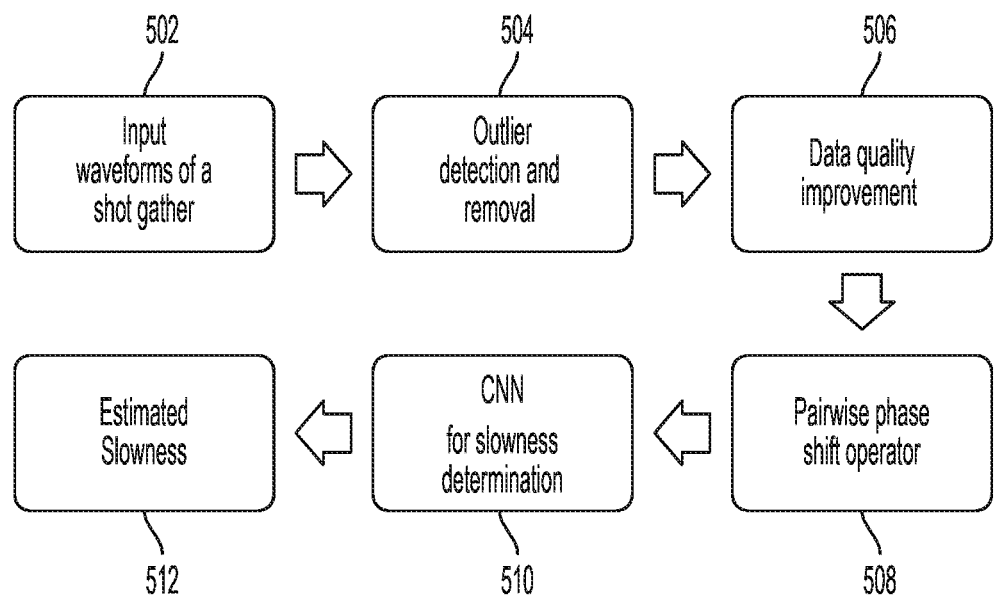
FIG. 16 is a flow chart of an exemplary determination of slowness for dipole waveforms.

With reference to FIG. 16, waveforms of a shot gather with dipole waveforms are input at step 502. In some embodiments, outliers are detected and removed from the input data at step 504. In some embodiments, data quality improvement (e.g., noise removal) is performed at step 506. In some embodiments, the data is transformed such as by a pairwise phase shift operator at step 408. At step 410, the CNN is applied to the (transformed) input data for slowness determination. At step 412, the determined slowness is output.

Figure 17:
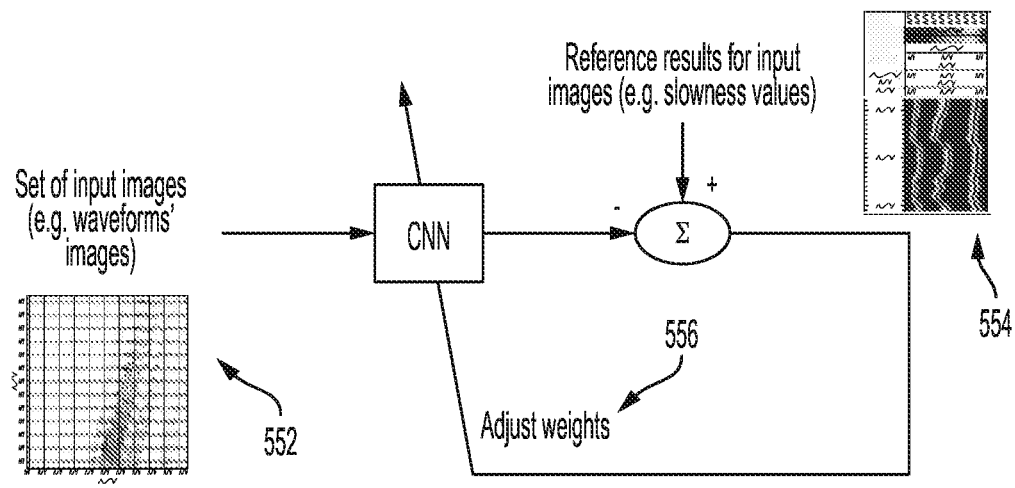
FIG. 17 is a block diagram of an exemplary training of a neural network.

With reference to FIG. 17, in the training process of the CNN, a set of reference input 552 (e.g., STA/LTA image for a given well at a given depth and a given bit size) and associated outputs 554 (e.g., compressional slowness) are provided. By providing a large collection of such training input/output data, the CNN model will update its numeric parameters/weights at 556. In this process, the model computes outputs to be matched with the provided reference ones. The model updates to reduce the error between its outputs and the provided reference output data.

The CNN may be trained for more than one output, e.g., provide input waveforms along the compressional slowness value(s), the shear slowness value(s), and the Stoneley slowness value(s) for the input image. The neural network training phase provides with a trained CNN model that can be exported and implemented in embedded software applications.

Figure 18:
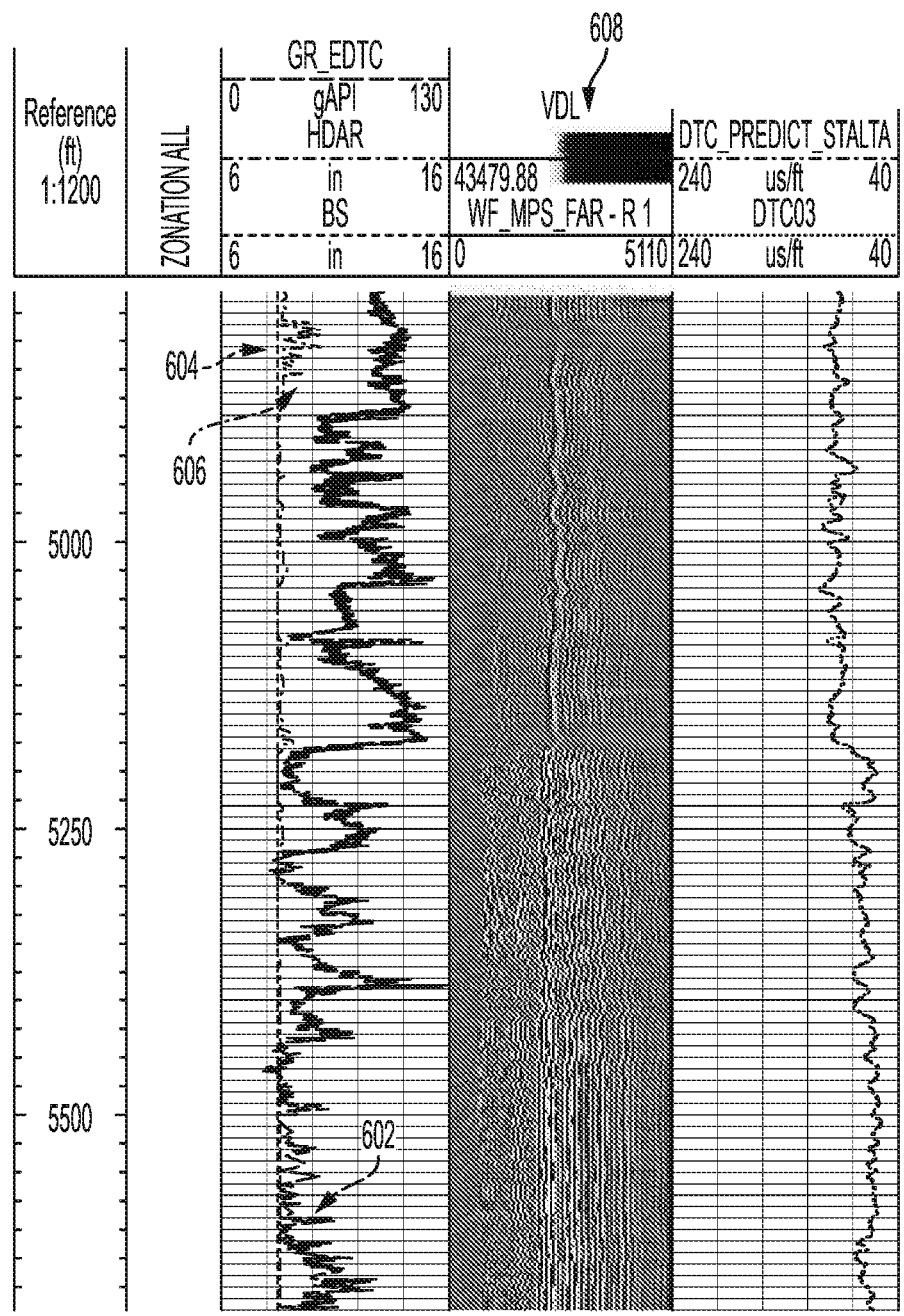
FIG. 18 is a block diagram of exemplary training output of a neural network with monopole data.

FIG. 18 shows the results of the training of a CNN model on a well. The input monopole waveforms were subject to noise reduction, then to the STA/LTA operator. In this example, the processing was done in a full array with all waveforms in the shot gather considered. It will be appreciated that less than a full array may also be used. The right track shows a comparison between the desired compressional slowness log (dashed line) and the CNN training output compressional slowness log (dotted line). The left track shows the gamma ray log 602, the bit size (dashed line 604) and the hole diameter (606). The middle track 608 shows the waveforms recorded by the first receiver over a depth interval. It will be appreciated that the CNN may also be trained with input waveforms and associated travel-times for compressional waves, shear waves, Stoneley waves and other data.

Figure 19:
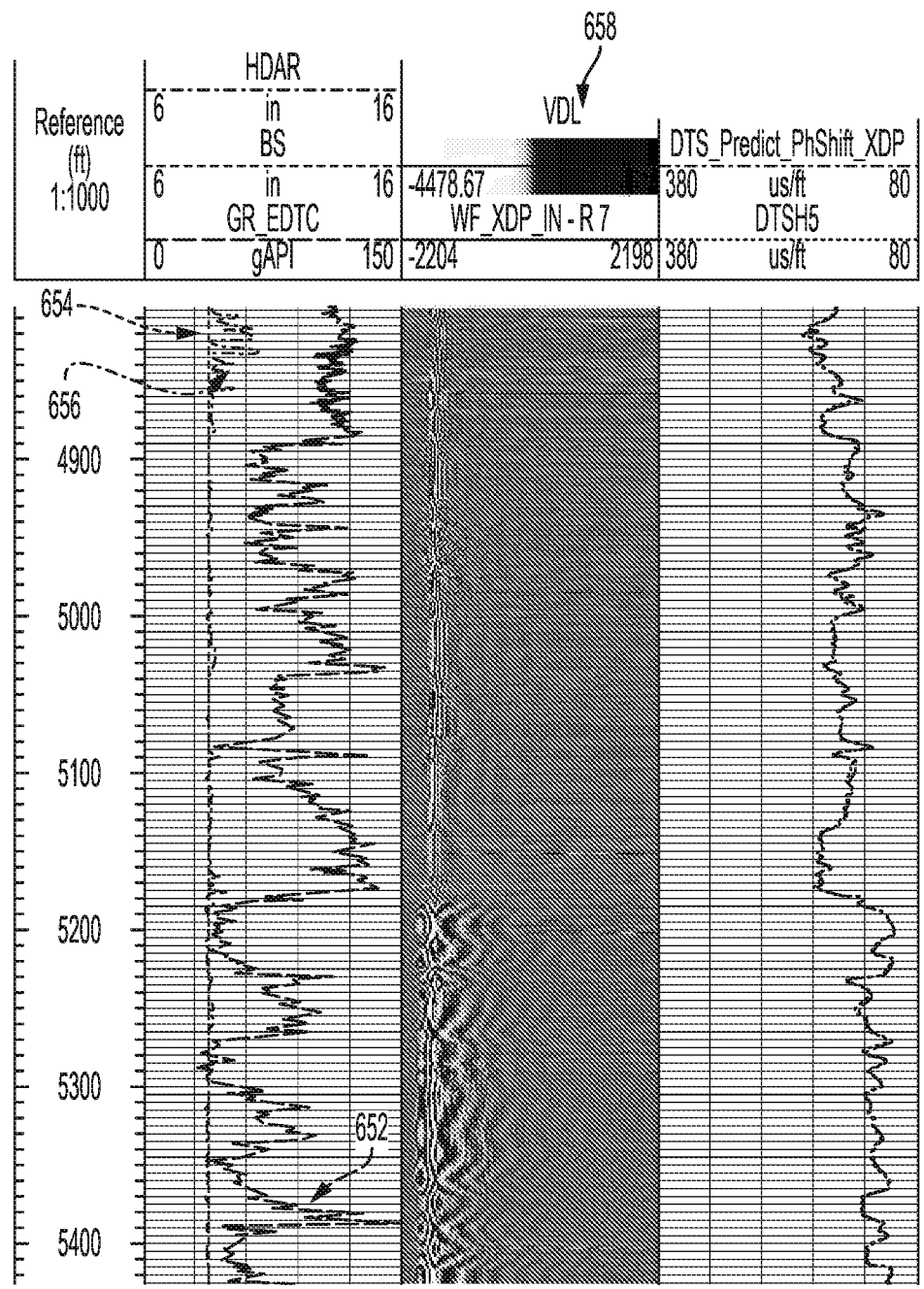
FIG. 19 is a block diagram of exemplary training output of a neural network with dipole data.

FIG. 19 shows the results of the training of a CNN model on a well. The input dipole waveforms were subject to transformation by a phase shift operator. In this example, the processing was done in a set of five consecutive receivers. It will be appreciated that a full array may also be used. The right track shows a comparison between the desired compressional slowness log (dashed line) and the CNN training output compressional slowness log (dotted line). The left track shows the gamma ray log 652, the bit size (dashed line 654) and the hole diameter (656). The middle track 658 shows the waveforms recorded by the first receiver over a depth interval. The multi-shot technique was used to generate both shear slowness logs.

While in the above discussion, the input waveforms have been subdivided into shot gathers to help generate the input images for the CNN, it will be appreciated that other ways of grouping the input data can also be used. For example, waveforms recorded by one receiver can be used to generate a CNN input image. Travel-times, and/or slowness values may also be used to train the neural network. In another example, the input data may include 3D images of the waveforms recorded by a sonic tool for a depth interval. A 3D image may include a collection of waveforms recorded by different receivers in a sonic tool. For respective tool position in a well, a 2D image is recorded (e.g., shot gather). When moving the sonic tool in the wellbore to cover a depth interval, a set of 2D images is generated yielding a 3D image. Along the 3D image, travel-times and/or slowness values may be used train the neural network.

Figure 20:
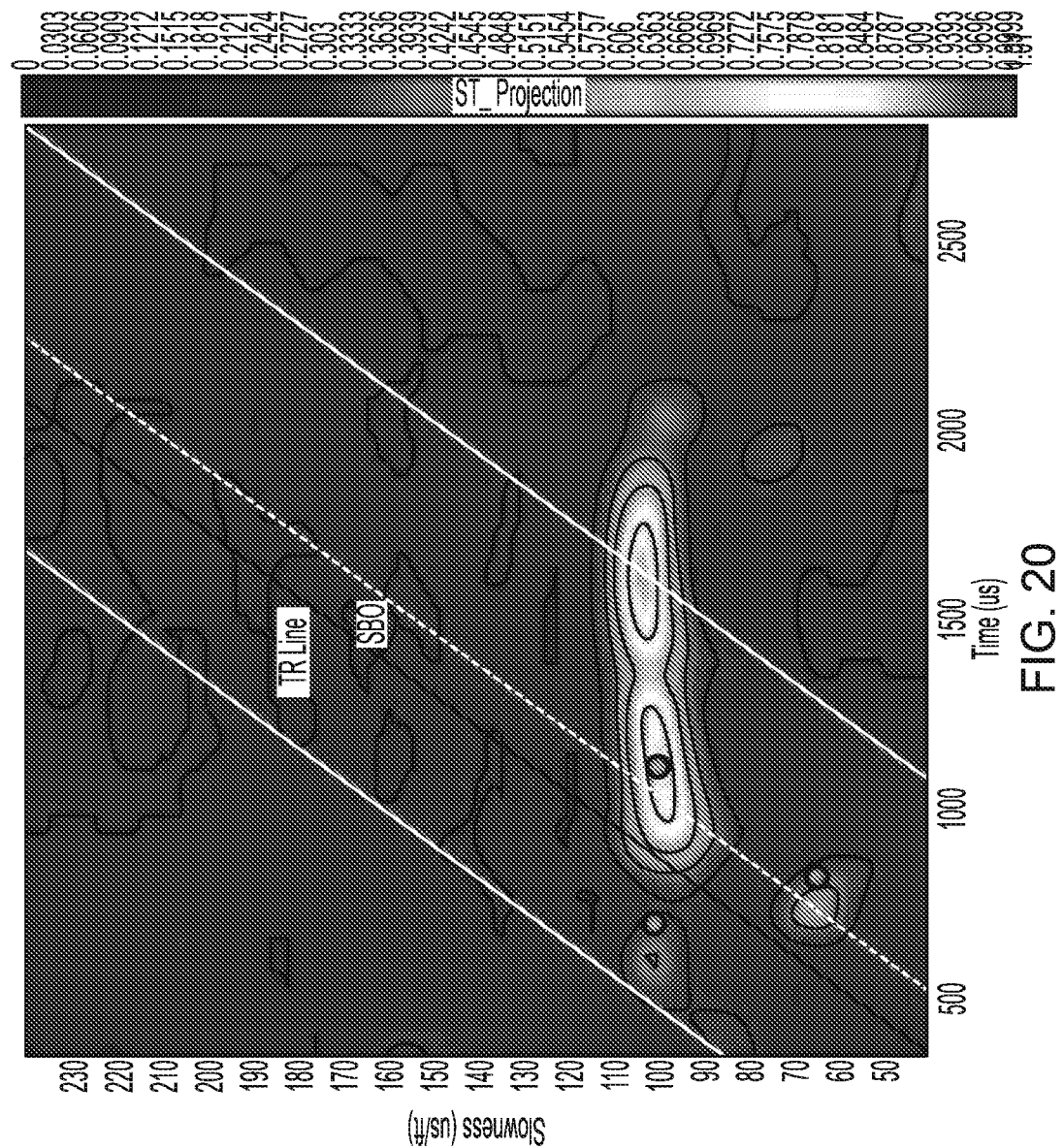
FIG. 20 is a plot of a 2D image that may be used as an exemplary input to a neural network.
Figure 21:
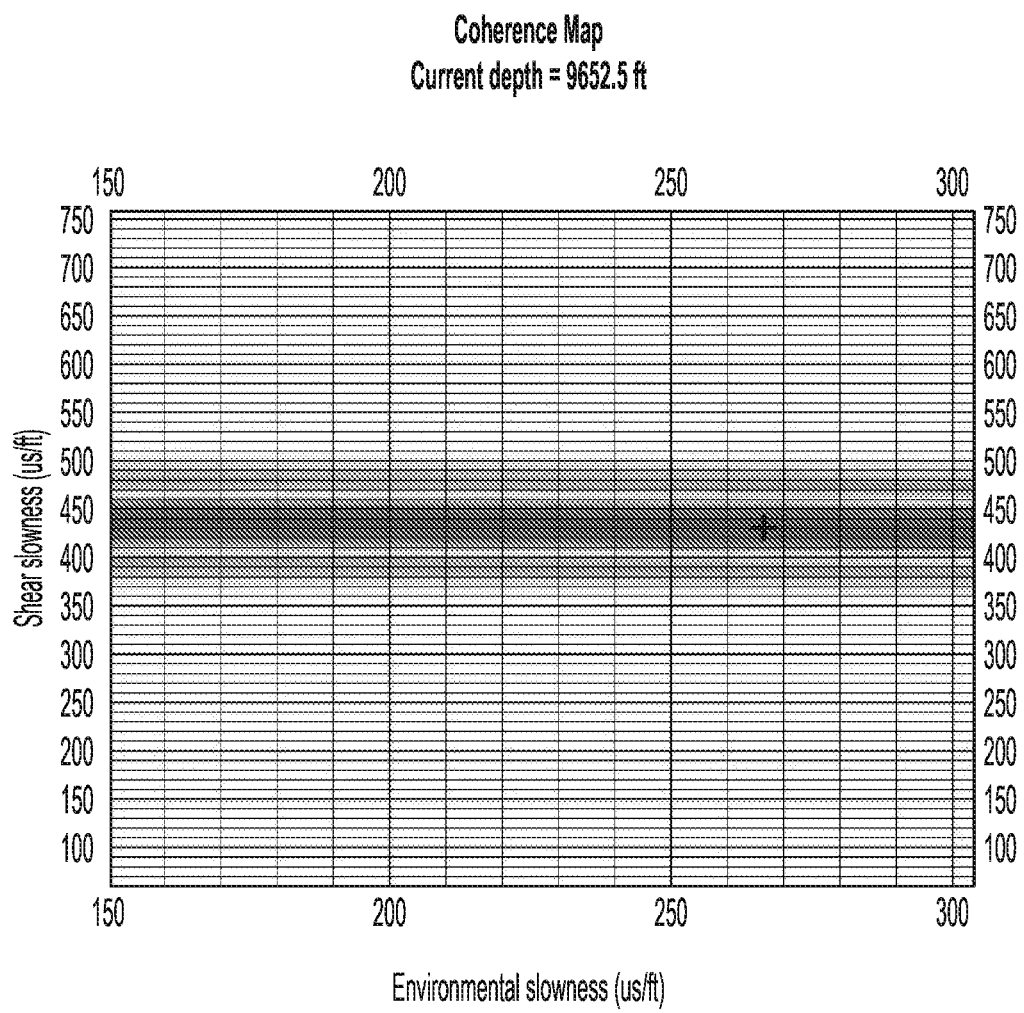
FIG. 21 is a plot of a quadrupole inversion that may be used as an exemplary input to a neural network.

In various embodiments, the inputs provided to the artificial intelligence may include 2D or 3D images generated by transforms such as deconvolution, STA/LTA, and phase shift operators. The input may also include 2D images generated by STC processing (for example as shown in FIG. 20 that depicts a 2D coherence image) or alternative processing techniques such as the quadrupole inversion (for example as shown in FIG. 21).

It will be appreciated that combinations of the described input may also be used. In some embodiments with several types of inputs such as a combination of different input images (e.g. STC single depth image, STA/LTA Image, Dispersion Analysis image), a CNN network may be used for each type of input. The outputs of the CNN networks may be combined to generate a final output.

Figure 22:
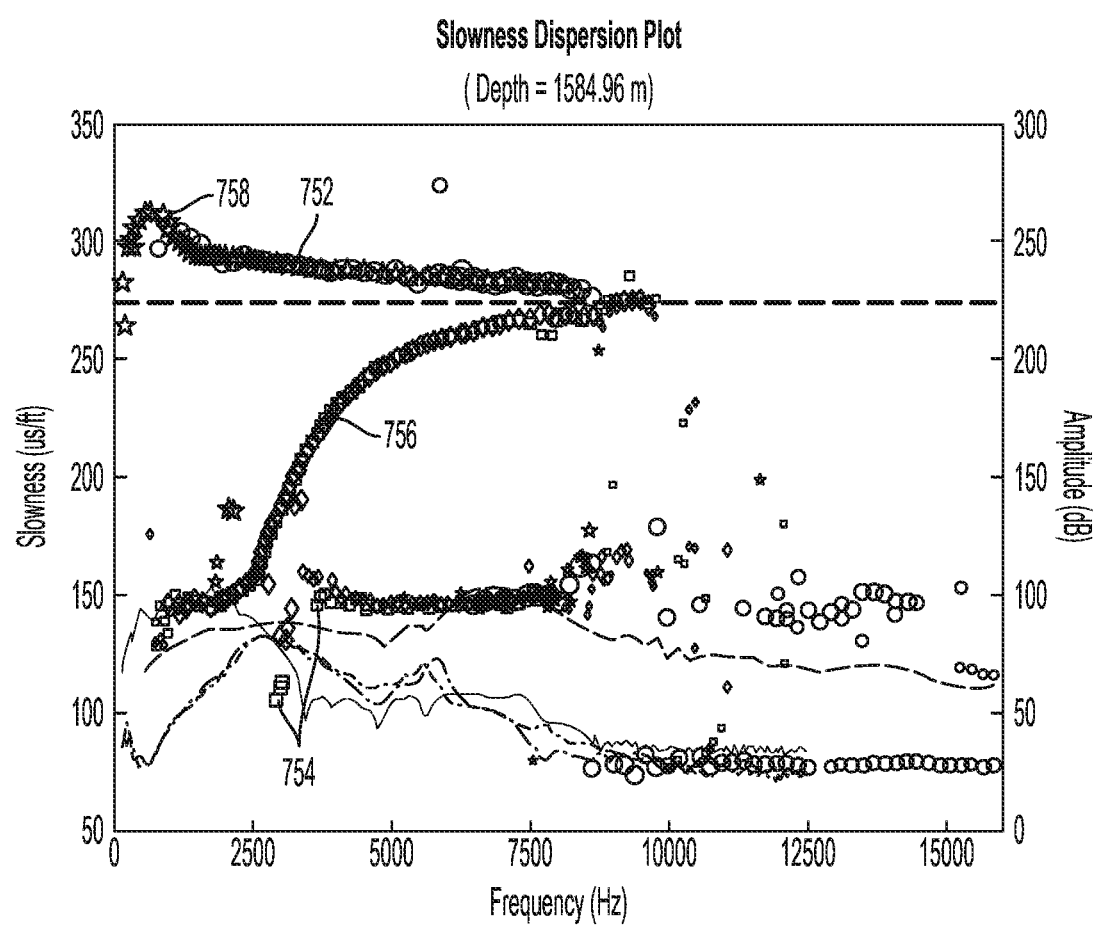
FIG. 22 is an exemplary dispersion plot.

An example of a dispersion analysis is shown in FIG. 22. This image is an example of data that may be used to train the neural network. The image includes data content for a sonic tool at a depth (e.g., 1584.96 m) In this example, the transformed monopole waveforms are represented by the circles 752. The monopole compressional slowness may be determined based on the data of circles 752 (the transformed monopole waveform information). The wireline dipole waveforms are represented by the squares 754 and diamonds 756. The shear slowness and/or the mud slowness may be determined based on the data of the squares 754 and the diamonds 756 (the wireline dipole waveform information). The data of the cyan circles may also be used in the determination of the Stoneley slowness and/or the mud slowness may also be determined. Various aspects of the dispersion data may be used for training. For example, one slowness value (e.g. dipole or quadrupole shear slowness) may be selected or several or all slowness values (e.g., compressional slowness along the dipole/quadrupole shear slowness, along the Stoneley slowness, and the mud slowness) may be selected.

Figure 23:
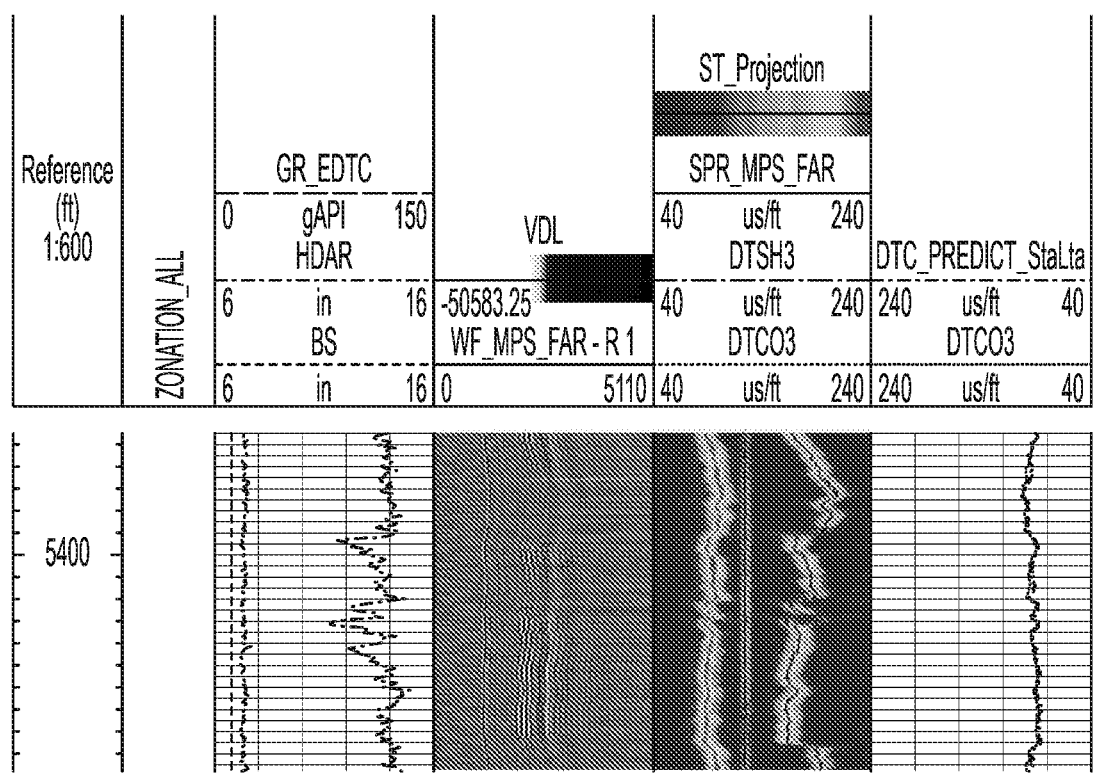
FIG. 23 is an exemplary display output of a neural network.

Referring back to FIG. 6, output from the neural network is provided at step 310. The output may be in the form of an interface to other software for further processing of the output. The output may also include displaying the neural network output. FIG. 21 is an exemplary format for displaying the output. In FIG. 23, output of a compressional slowness determination provided by a CNN trained model on monopole waveforms is shown. The trained model was applied to the monopole waveforms of a well that was not used in the training phase. The determined compressional slowness is displayed in the last track (dashed lines). For the sake of having a reference result, in the same track in purple, the result of the compressional slowness processing provided by an expert user when running the STC algorithm is shown in a dotted line. The left track shows the gamma ray log, the bit size, and the hole diameter. The second track shows the waveforms recorded by the first receiver over a depth interval. The third track shows STC intermediate processing results. The displayed results were obtained for the full array processing approach and the CNN predicted compressional slowness logs.

It will be appreciated that the present disclosure is not limited to the determination of sonic slowness. The described approach may also be used to determine any attribute in a sonic waveform without limitation. For example, the processing sonic waveforms may be used to determine attributes including travel-times of the mode of interest (e.g. P-waves, S-waves), fast-shear azimuth, stiffness tensor parameters, and so forth.

Figure 24:
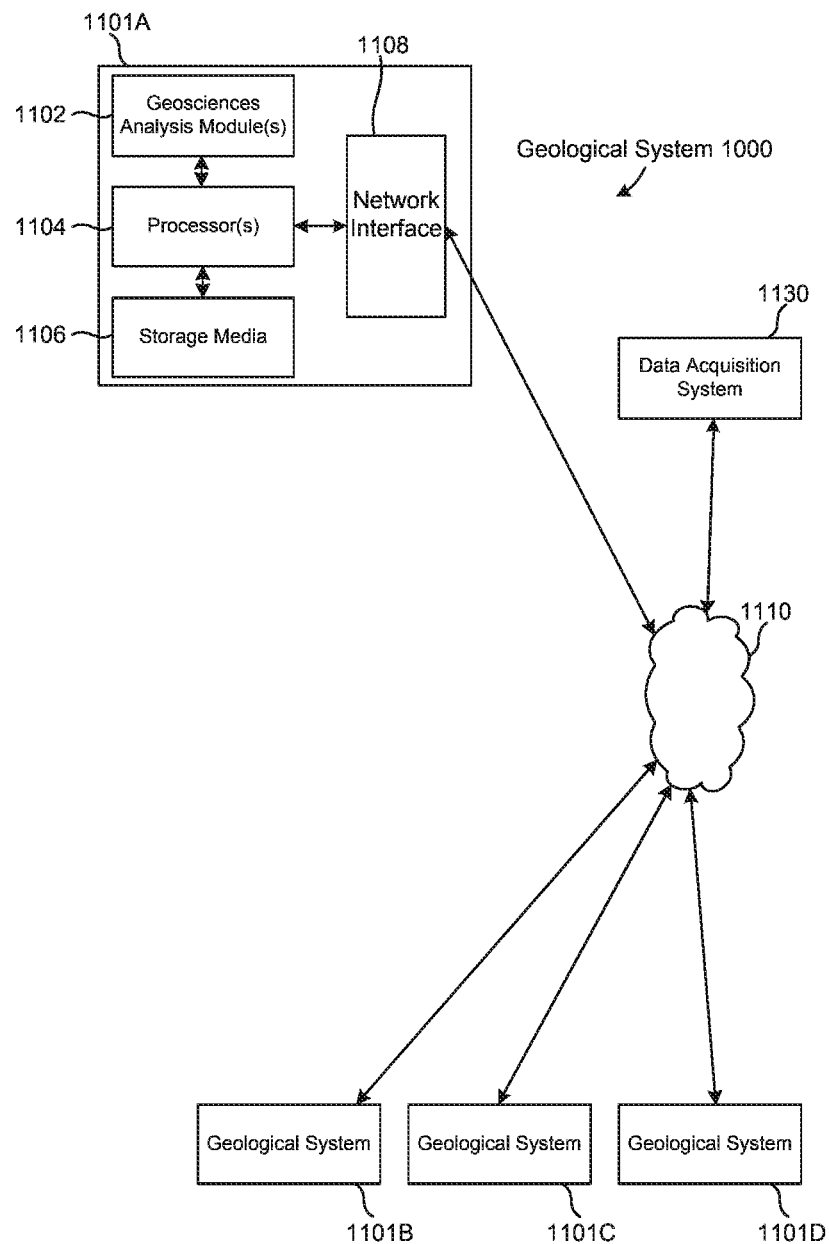
FIG. 24 is a block diagram of an exemplary architecture for a geological system.

FIG. 24 depicts an example geological system 1000 in accordance with some embodiments. The system 1000 can be an individual system 1101A or an arrangement of distributed systems. The system 1101A includes one or more geosciences analysis modules 1102 that are configured to perform various tasks according to some embodiments, such as one or more methods disclosed herein. To perform these various tasks, geosciences analysis module 1102 executes independently, or in coordination with, one or more processors 1104, which is (or are) connected to one or more storage media 1106A. The processor(s) 1104 is (or are) also connected to a network interface 1108 to allow the system 1101A to communicate over a data network 1110 with one or more additional systems and/or systems, such as 1101B, 1101C, and/or 1101D (note that systems 1101B, 1101C and/or 1101D may or may not share the same architecture as system 1101A, and may be located in different physical locations, e.g. systems 1101A and 1101B may be on a ship underway on the ocean or at a wellsite, while in communication with one or more systems such as 1101C and/or 1101D that are located in one or more data centers on shore, other ships, and/or located in varying countries on different continents). Note that data network 1110 may be a private network, it may use portions of public networks, it may include remote storage and/or applications processing capabilities (e.g., cloud computing).

A processor can include a microprocessor, microcontroller, processor module or subsystem, programmable integrated circuit, programmable gate array, or another control or computing device.

The storage media 1106 can be implemented as one or more computer-readable or machine-readable storage media. Note that while in the exemplary embodiment of FIG. 1 storage media 1106 is depicted as within computer system 1101A, in some embodiments, storage media 1106 may be distributed within and/or across multiple internal and/or external enclosures of computing system 1101A and/or additional computing systems. Storage media 1106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs), BluRays or any other type of optical media; or other types of storage devices. Note that the instructions discussed above can be provided on one computer-readable or machine-readable storage medium, or alternatively, can be provided on multiple computer-readable or machine-readable storage media distributed in a large system having possibly plural nodes and/or non-transitory storage means. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that system 1101A is only one example and that system 1101A may have more or fewer components than shown, may combine additional components not depicted in the example embodiment of FIG. 1, and/or system 1101A may have a different configuration or arrangement of the components depicted in FIG. 1. The various components shown in FIG. 1 may be implemented in hardware, software, or a combination of both hardware and software, including one or more signal processing and/or application specific integrated circuits.

It should also be appreciated that system 1000 may include user input/output peripherals such as keyboards, mice, touch screens, displays, etc. The system 1000 may include desktop workstations, laptops, tablet computers, smartphones, server computers, etc.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with hardware are all included within the scope of the disclosure.

Data acquisition system 1130 may include systems, sensors, user interface terminals, and the like, which are configured to receive data corresponding to records collected at an oil services facility, such as an exploration unit, oil drilling rig, oil or gas production system, etc. Acquired data may include acoustic data such as the sonic logging data discussed above as well as other sensor data, employee log data, computer generated data, and the like.

Figure 25:
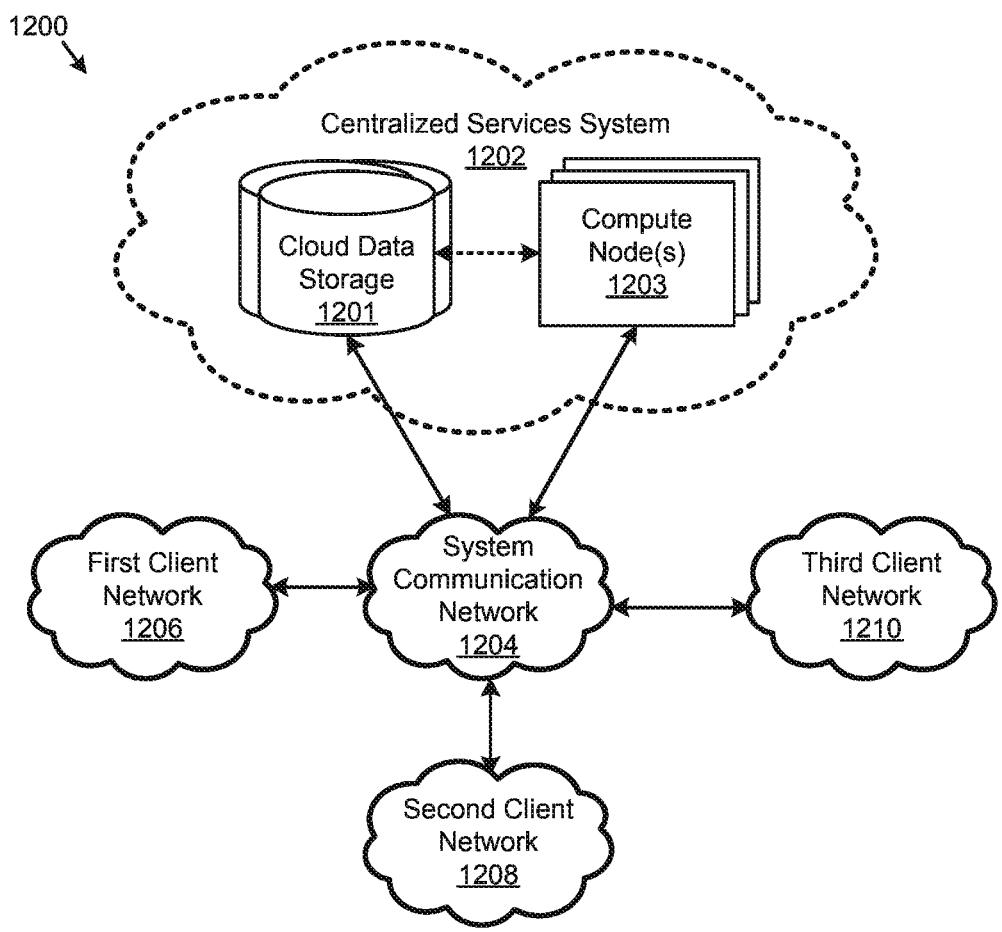
FIG. 25 is a block diagram of an exemplary architecture for a geological system.

With reference to FIG. 25, a multi-client system 1200 may include a centralized services system 1202, which may be implemented on a cloud services system, for example. In such an embodiment, the centralized services system 1202 may include one or more cloud data storage systems 1201 and one or more compute nodes 1203. If such an embodiment, the system 1200 may include multiple client networks, including a first client network 1206, a second client network 1208, and a third client network 1210. Each client network 1206-1210 may communicate with the centralized services system 1202 via a system communication network 1204, which may be the Internet or a dedicated WAN connection.

In such embodiments, each of the client networks 1206-1210 may include components described in FIG. 24, such as the computer systems 1101A-D and the data acquisition system 1130, etc. Such devices may be further connected via an internal network 1110. In an embodiment, the first client network 1206 may be operated by a first customer of a data analysis system provider. In another embodiment, the second client network 1208 and the third client network 1210 may both be operated by a second customer, but at separate geographic locations. One of ordinary skill will recognize a variety of client/customer relationships that may be established.

In such an embodiment, each of the client networks 1206-1210 may communicate with the centralized services system 1202 for data storage and implementation of certain centralized data processing and analysis processes. Benefi-cially, the centralized services system 1202 may be configured for large scale data storage and data processing.

The present embodiments have been described with particular benefit for geological systems and services. The individual aspects and ordered combinations provide a unique and improved solution to provide accurate determination of sonic slowness, in some cases automatically, that may, in some embodiments, facilitate practical real time decision processes based on the determined sonic slowness. While these benefits have been highlighted for geological systems and services, it will be appreciated that additional fields, which may benefit from the present embodiments, include archeology, marine biology, and the like. Although the embodiments described herein may be useful in any of these many geological fields, the present embodiments are described primarily with reference to oil services.

It will also be appreciated that the described methods cannot be performed mentally. For example, the neural network has image processing capabilities that cannot be achieved by a person on any reasonable time scale. Moreover, machine learning techniques are performed, for example, by specially programmed machines.

Although the invention(s) is/are described herein with reference to specific embodiments, various modifications and changes can be made without departing from the scope of the disclosure. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for determining sonic slowness, comprising:
    accessing sonic logging data including a sonic waveform associated with a plurality of shot gathers;
    applying a transformation operator to the sonic logging data to provide a transformed sonic image, the transformation operator including at least one of a short time average long time average (STA/LTA) operator, a phase shift operator, and a deconvolution operator;
    performing a machine learning process using the transformed sonic image to determine a sonic slowness associated with the sonic logging data; and
    providing the sonic slowness as an output.

2. The method of claim 1, wherein the sonic logging data includes a shot gather of a monopole waveform, and the transformation operator includes the STA/LTA operator.

3. The method of claim 1, wherein the sonic logging data includes a shot gather of a dipole waveform, and the transformation operator includes the phase shift operator.

4. The method of claim 1, wherein the sonic logging data includes a two-dimensional image, and the transformation includes the deconvolution operator.

5. The method of claim 1, wherein the sonic logging data includes a three-dimensional image, and the transformation includes the deconvolution operator.

6. The method of claim 1, wherein the machine learning process includes a convolutional neural network.

7. The method of claim 1, wherein the determined sonic slowness includes at least one of a slowness of a compressional wave, a slowness of a shear wave, a slowness of a Stoneley wave, a slowness of a leaky-P wave, a slowness of a Raleigh wave, and a slowness of a pseudo-Raleigh wave.

8. The method of claim 1, wherein the providing includes displaying the sonic slowness.

9. The method of claim 8, wherein the providing includes displaying the sonic slowness as a function of depth.

10. An apparatus, comprising:
   an interface configured to obtain sonic logging data including a sonic waveform associated with a plurality of shot gathers;
   a memory configured to store computer executable instructions; and
   a processor operatively coupled to the interface and the memory, the processor being configured to execute the instructions and cause the apparatus to:
      apply a transformation operator to the sonic logging data to provide a transformed sonic image, the transformation operator including at least one of a short time average long time average (STA/LTA) operator, a phase shift operator, and a deconvolution operator;
      perform a machine learning process using the transformed sonic image to determine a sonic slowness associated with the sonic logging data; and
      provide the sonic slowness as an output.

11. The apparatus of claim 10, wherein the sonic logging data includes a shot gather of a monopole waveform, and the transformation operator includes the STA/LTA operator.

12. The apparatus of claim 10, wherein the sonic logging data includes a shot gather of a dipole waveform, and the transformation operator includes the phase shift operator.

13. The apparatus of claim 10, wherein the sonic logging data includes a two-dimensional image, and the transformation includes the deconvolution operator.

14. The apparatus of claim 10, wherein the sonic logging data includes a three-dimensional image, and the transformation includes the deconvolution operator.

15. The apparatus of claim 10, wherein the machine learning process includes a convolutional neural network.

16. The apparatus of claim 10, wherein the determined sonic slowness includes at least one of a slowness of a compressional wave, a slowness of a shear wave, and a slowness of a Stoneley wave.

17. The apparatus of claim 10, wherein the apparatus includes a display configured to display the sonic slowness.

18. The apparatus of claim 17, wherein the display is configured to display the sonic slowness as a function of depth.

* * * * *